(12) United States Patent
Zhao et al.

(10) Patent No.: US 12,139,165 B2
(45) Date of Patent: *Nov. 12, 2024

(54) AUTONOMOUS VEHICLE TO OVERSIGHT SYSTEM COMMUNICATIONS

(71) Applicant: TuSimple, Inc., San Diego, CA (US)

(72) Inventors: Changyi Zhao, San Diego, CA (US); Joyce Tam, Pleasanton, CA (US); Bin Huang, Huntington Beach, CA (US)

(73) Assignee: TUSIMPLE, INC., San Diego, CA (US)

( * ) Notice: Subject to any disclaimer, the term of this patent is extended or adjusted under 35 U.S.C. 154(b) by 169 days.

This patent is subject to a terminal disclaimer.

(21) Appl. No.: 17/243,900

(22) Filed: Apr. 29, 2021

(65) Prior Publication Data

US 2022/0348223 A1 Nov. 3, 2022

(51) Int. Cl.
*B60W 60/00* (2020.01)
*B60W 40/02* (2006.01)
(Continued)

(52) U.S. Cl.
CPC ........ *B60W 60/0011* (2020.02); *B60W 40/02* (2013.01); *B60W 50/00* (2013.01);
(Continued)

(58) Field of Classification Search
CPC .. B60W 60/0011; B60W 40/02; B60W 50/00; B60W 2556/50; B60W 2556/65;
(Continued)

(56) References Cited

U.S. PATENT DOCUMENTS 9,141,112 B1    9/2015    Loo
10,663,977 B2 *   5/2020    Cheng .................... H04W 4/44
(Continued)

FOREIGN PATENT DOCUMENTS

EP      2437129 A3     3/2017
EP      3363005 B1 *   4/2019    ....... G08G 1/096741
(Continued)

OTHER PUBLICATIONS

Machine Translation of EP 3363005 B1 (Year: 2019).*
(Continued)

*Primary Examiner* — Hussein Elchanti
*Assistant Examiner* — Kenneth M Dunne
(74) *Attorney, Agent, or Firm* — Perkins Coie LLP

(57) ABSTRACT

A system comprises an autonomous vehicle (AV) and a control device operably coupled with the AV. The control device receives, from an operation server, a command to navigate the AV to avoid an expected road condition. The control device receives, from sensors of the AV, sensor data comprising location coordinates of a plurality of objects ahead of the AV. The control device determines whether at least one object from the plurality of objects impedes performing the command. In response to determining that at least one object impedes performing the command, the control device updates the command, such that the updated command comprises one or more navigation instructions to avoid the at least one object while performing the command. The control device navigates the AV according to the updated command.

7 Claims, 10 Drawing Sheets

(51) Int. Cl.
 B60W 50/00 (2006.01)
 G05D 1/00 (2024.01)
 G07C 5/08 (2006.01)
 H04W 4/46 (2018.01)
(52) U.S. Cl.
 CPC ......... *G05D 1/0293* (2013.01); *G05D 1/0295* (2013.01); *G07C 5/0808* (2013.01); *H04W 4/46* (2018.02); *B60W 2050/0075* (2013.01); *B60W 2300/145* (2013.01); *B60W 2556/50* (2020.02); *B60W 2556/65* (2020.02)
(58) Field of Classification Search
 CPC B60W 2300/145; H04W 4/46; G05D 1/0293; G05D 1/0295; G05D 2201/0213; G07C 5/0808
 See application file for complete search history.

(56) References Cited

U.S. PATENT DOCUMENTS

| | | | |
|---|---|---|---|
| 10,712,748 | B2 | 7/2020 | Smartt et al. |
| 11,312,300 | B1* | 4/2022 | Ganlath ................. G06V 20/56 |
| 11,458,993 | B2* | 10/2022 | Brown ................ B60W 30/143 |
| 11,472,442 | B2* | 10/2022 | Duan ..................... G01C 21/32 |
| 2009/0079639 | A1 | 3/2009 | Hotta et al. |
| 2018/0066954 | A1* | 3/2018 | Oder ..................... G05D 1/021 |
| 2018/0136644 | A1* | 5/2018 | Levinson ............ H04L 41/0816 |
| 2018/0165895 | A1 | 6/2018 | Poeppel et al. |
| 2018/0259966 | A1* | 9/2018 | Long ..................... G05D 1/0246 |
| 2018/0292822 | A1* | 10/2018 | Ichikawa ............... G06V 20/58 |
| 2018/0307915 | A1* | 10/2018 | Olson ................... G05D 1/0251 |
| 2020/0209845 | A1* | 7/2020 | Chen ..................... G05D 1/0038 |
| 2020/0276977 | A1* | 9/2020 | Saleh ................. B60W 50/0098 |
| 2020/0346662 | A1 | 11/2020 | Suzuki ............. B60W 60/00276 |
| 2021/0018916 | A1* | 1/2021 | Thakur ................. G07C 5/0808 |
| 2021/0072743 | A1* | 3/2021 | Otaki ................. G01C 21/3863 |
| 2021/0132604 | A1* | 5/2021 | Gillett .................. G05D 1/0016 |
| 2022/0126864 | A1* | 4/2022 | Moustafa ............. G05D 1/0061 |

FOREIGN PATENT DOCUMENTS

| | | |
|---|---|---|
| EP | 3690853 A1 | 8/2020 |
| WO | 2015057638 A1 | 4/2015 |
| WO | 2019043446 A1 | 3/2019 |

OTHER PUBLICATIONS

Zhao, C. et al., "Oversight System To Autonomous Vehicle Communications," U.S. Appl. No. 17/243,785, filed Apr. 29, 2021, 82 pages.

Zhao, C. et al., "Direct Autonomous Vehicle To Autonomous Vehicle Communications," U.S. Appl. No. 17/243,981, filed Apr. 29, 2021, 84 pages.

European Search Report, EP Application No. 22167418, dated Oct. 13, 2022.

* cited by examiner

AUTONOMOUS VEHICLE TO OVERSIGHT SYSTEM COMMUNICATIONS

TECHNICAL FIELD

The present disclosure relates generally to autonomous vehicles. More particularly, the present disclosure is related to autonomous vehicle to oversight system communications.

BACKGROUND

One aim of autonomous vehicle technologies is to provide vehicles that can safely navigate towards a destination. In some cases, an unexpected road condition may occur on a road traveled by an autonomous vehicle. For example, an unexpected weather condition or unexpected traffic may be observed on the road ahead of the autonomous vehicle. Current autonomous vehicle technologies are not configured to account for such unexpected road conditions.

SUMMARY

Current autonomous vehicle technologies are not configured to account for unexpected road conditions. This disclosure recognizes various problems and previously unmet needs related to communicating commands to autonomous vehicles (AVs). Certain embodiments of this disclosure provide unique technical solutions to technical problems of current autonomous vehicle technologies, including those problems described above to communicate commands to one or more AVs heading toward unexpected road conditions. The disclosed system is configured to determine different levels of granularity of commands for one or more AVs. In some examples, the commands may be broad commands, while in other examples they may be specific commands.

The broad commands may be related to a specific road condition, and directed to one or more AVs heading toward a specific road condition. The unexpected road conditions may include, but are not limited to, an unexpected weather condition, an unexpected traffic congestion, a road closure, an obstacle on a road, a construction zone, among others. For example, an unexpected road condition on a road traveled by one or more AVs may be detected, by an operation server operably coupled with the one or more AVs, by analyzing environmental data associated with a time window during which the one or more AVs are traveling along the road, and comparing the environmental data with map data that comprises expected road conditions. The environmental data may comprise weather data and traffic data. The operation server may access the environmental data from external sources, such as live weather reporting, live traffic reporting, etc. Upon detecting the unexpected road condition, a broad command may be communicated to the one or more AVs, indicating that the unexpected road condition is detected on the road, and to take a detour.

The specific commands may be related to a specific road condition, and directed to a particular AV experiencing the specific road condition. For example, assume that the particular AV is traveling along a road that is closed by a road closure. Upon detecting the road closure, by the operation server operably coupled with the particular AV, a specific command may be communicated to the particular AV, indicating to take specific action (e.g., take the next exit, take a first right turn, proceed fifty feet, and pull over).

This disclosure contemplates detecting various unexpected road conditions, and issuing commands (e.g., broad or specific commands) to one or more AVs headed toward an unexpected road condition. In some cases, a command is communicated from an operation server to one or more AVs, similar to the examples described above, i.e., an operation server-to-AV commands.

In some cases, upon receiving a command, an AV (or an in-vehicle control device associated with the AV) may update the command based on analyzing sensor data received from sensors on the AV. For example, the AV may update the command, if the in-vehicle control device determines that there is an obstacle on a pathway for navigating the AV according to the issued command. For example, assume that a command sent to the AV indicates to pull over to a first location on a side of a road. Also, assume that the sensors of the AV detect that the first location is occupied by an obstacle. Thus, in this example, the in-vehicle control device determines that the obstacle impedes performing the issued command. Thus, the in-vehicle control device may search for an obstacle-free location. Upon finding a second location that is obstacle-free, the in-vehicle control device may update the command to pull the AV over to the second location, e.g., fifty feet ahead of the first location.

In some cases, an AV may communicate a command to the operation server, i.e., an AV-to-operation server command. For example, an AV may communicate a command that includes one or more navigation instructions to the operation server upon detecting an unexpected object on its traveling pathway. The AV (or an in-vehicle control device associated with the AV) may detect the unexpected object by analyzing sensor data received from its sensors, and comparing the sensor data with map data that includes expected objects ahead of the AV, such as road signs, buildings, terrain, lane markings, road boundaries, traffic lights, etc. By comparing the sensor data and the map data, the AV may detect that the unexpected object included in the sensor data is not included in the map data. The AV may determine a proposed command or navigation instruction to avoid the unexpected object. The AV may communicate the proposed command to the operation server for confirmation, affirmation, or acknowledgment. The operation server may confirm, revise, or override the proposed command, and communicate a confirmation or revision to the AV. Upon receiving the confirmation or revision, the AV may perform the original or a revised command.

In some cases, a first AV may communicate a command to a second AV, i.e., an AV-to-AV command. For example, assume that the first and second AVs are on the same road, and the first AV is ahead of the second AV. Also, assume that the first AV has received a command, from the operation server, to avoid an unexpected road condition ahead of the first AV. The first AV may or may not update the command, based on analyzing the sensor data, similar to that described above.

In one embodiment, the first AV may indirectly communicate the command (or the updated command) to the second AV. For example, the first AV may communicate the command (or the updated command) to the operation server, and the operation server may communicate the command (or the updated command) to the second AV.

In another embodiment, the first AV may directly communicate the command (or the updated command) to the second AV, for example, using a Vehicle-2-Vehicle (V2V) network interface if the second AV is within a V2V communication range of the first AV. In this embodiment, the first AV accesses environmental data associated with a portion of the road between the first AV and the second AV. The environmental data may comprise location coordinates of a plurality of objects detected by the sensors of the first AV while the first AV was traveling along the portion of the road between the first and second AVs. Since the first AV has already traveled the portion of the road between the first and second AVs, the first AV has experienced and recorded the environmental data. The first AV may determine whether an object detected in the sensor data and/or environmental data (associated with the portion of the road between the first and second AVs), impedes performing the issued command by the second AV. In this process, for example, the first AV may receive the trajectory of the second AV (e.g., from the operation server and/or the second AV), and determine whether any object detected in the sensor data and/or environmental data is on the traveling pathway of the second AV. The first AV may determine that an object impedes performing the command by the second AV, if the object is on the traveling pathway of the second AV. If the first AV determines that the object detected in the sensor data and/or environmental data impedes performing the issued command by the second AV, the first AV updated the command for the second AV such that the updated command includes one or more navigation instructions to avoid objects on the traveling pathway of the second AV while performing the command. In a similar manner, the first AV may communicate a second updated command to a third AV traveling behind the second AV, based on analyzing the aggregate of environmental data associated with the road between the first AV and the third AV, if the third AV is in the V2V communication range of the first AV.

In cases where the third AV is not in the V2V communication range of the first AV, but the third AV is in the V2V communication range of the second AV, the second AV may access and analyze the environmental data associated with the road between the second AV and the third AV, and communicate a command to the third AV to avoid objects on the traveling pathway of the third AV while performing the command. In this manner, this disclosure contemplates communications among a network mesh of AVs, where different subsets of AVs may be in various V2V communication ranges from other subsets of AV. Thus, this disclosure contemplates one-to-one, one-to-many, and many-to-many communications among the network mesh of AVs and the operation server.

With respect to communicating commands from an operation server to an AV, in one embodiment, a system comprises an AV and an operation server. The AV comprises at least one vehicle sensor, where the AV is configured to travel along a road. The operation server is communicatively coupled with the AV. The operation server comprises a processor. The processor is configured to access environmental data associated with the road ahead of the AV. The environmental data is associated with a time window during which the AV is traveling along the road. The processor compares the environmental data with map data that comprises expected road conditions ahead of the AV. Based on comparing the environmental data with the map data, the processor determines whether the environmental data comprises an unexpected road condition that is not included in the map data. In response to determining that the environmental data comprises the unexpected road condition that is not included in the map data and/or an operational design domain that corresponds to conditions that the AV is capable of operating safely, the processor determines a location coordinate of the unexpected road condition, and communicates a command to the AV to maneuver to avoid the unexpected road condition.

With respect to an receiving a command, by an AV, from an operation server, in one embodiment, a system comprises an AV and a control device. The AV comprises at least one vehicle sensor, where the AV is configured to travel along a road. The control device is associated with the AV. The control device comprises a processor. The processor is configured to receive, from an operation server, a command to navigate the AV to avoid an unexpected road condition. The processor receives, from the at least one vehicle sensor, sensor data comprising location coordinates of a plurality of objects ahead of the AV. The processor determines whether at least one object from the plurality of objects impedes performing the command. In response to determining that the at least one object from the plurality of objects impedes performing the command, the processor updates the command, such that the updated command comprises one or more navigation instructions to avoid the at least one object while performing the command. The processor navigates the AV according to the updated command.

With respect to a lead AV communicating a command to a following AV, in one embodiment, a system comprises the lead AV and the following AV. The lead AV comprises at least one vehicle sensor. The lead AV is configured to travel along a road. The following AV is different from the lead AV, and is communicatively coupled with the lead AV. The following AV is traveling along the road behind the lead AV. The lead AV is associated with a control device. The control device comprises a first processor. The first processor is configured to receive a command to navigate the lead AV to avoid an unexpected road condition ahead of the lead AV. The first processor receives, from the at least one vehicle sensor, sensor data comprising location coordinates of a first plurality of objects ahead of the lead AV. The first processor accesses a first set of environmental data associated with a portion of the road between the lead AV and the following AV. The first set of environmental data comprises location coordinates of a second plurality of objects between the lead AV and the following AV. The first processor determines whether at least one object from the first and second plurality of objects impedes performing the command by the following AV. In response to determining that the at least one object impedes performing the command by the following AV, the processor updates the command for the following AV based at least in part upon the sensor data and the first set of environmental data, such that the updated command comprises one or more navigation instructions to avoid the at least one object while performing the command. The first processor communicates the updated command to the following AV.

The disclosed systems provide several practical applications and technical advantages which include: 1) technology that determines different granularity levels of commands, including broad and specific commands, where each granularity level of commands may be related to a specific road condition, and directed to one or more AVs that are headed toward the specific road condition; 2) technology that communicates a command (e.g., broad or specific command) to a first AV to avoid an unexpected road condition on a road traveled by the first AV, in response to detecting the unexpected road condition, where the unexpected road condition is associated with a time window during which the first AV is traveling along the road; 3) technology that updates a received command, in response to detecting an obstacle on a pathway of navigating the first AV according to the received command, and determining that the obstacle impedes navigating the first AV according to the received command; 4) technology that enables indirect data communication between the first AV and a second AV through an operation server; 5) technology that enables direct data communication between the first AV and the second AV within a V2V communication range; and 6) technology that communicates the command (or the updated command) to the second AV, informing the second AV about the unexpected road condition and the obstacle impeding navigation according to the issued command.

As such, the systems described in this disclosure may be integrated into a practical application of determining a more efficient, safe, and reliable solution for determining and communicating commands to AVs to avoid unexpected road conditions. Furthermore, the systems described in this disclosure may be integrated into an additional practical application of determining a more efficient, safe, and reliable navigation solution for AVs that are headed toward an unexpected road condition, even if the unexpected road condition is not within the field of view or detection zone of sensors of those AVs. For example, from live weather reporting and/or traffic reporting, the operation server may detect an unexpected road condition that is outside the detection zone of the sensors of the AVs, and issue a command to the AVs to avoid the unexpected road condition. Accordingly, the disclosed system may improve the current autonomous vehicle technologies.

Furthermore, the disclosed system may improve data communication among AVs and the operation server that is tasked to oversee operations of the AVs. For example, the disclosed system may establish a communication channel between a first AV and one or both of the operation server and a following AV within a V2V communication range of the first AV. As such, the first AV can send and receive data (e.g., command or any other data) to and from the operation server and/or the following AV.

As such, by improving data communication among the AVs and the operation server, the disclosed system provides frequency bandwidth allocation flexibility for different AVs in cases where a fleet of AVs are on traveling on the same road. Thus, the disclosed system may leverage the V2V communications for load balancing and processing resource balancing at different network/access nodes (e.g., the operation server or any AV in the fleet) to reduce or minimize data transmission overhead at one access/network.

Furthermore, by improving data communication among the AVs and the operation server, the disclosed system may further improve tracking the AVs and monitoring autonomous operations of the AVs. For example, current data communication technologies used in the current autonomous vehicle technologies may suffer from limitations of an existing network infrastructure that is already in place. The disclosed system may implement in an AV one or more computing agent units that are configured to operate in various communication states.

For example, when the AV is connected to an operation server and a following AV, the one or more computing agent units transition to a "connected to the operation server and a following AV" state. In this state, the AV can send and receive data (e.g., command or any other data) to and from the operation server and/or the following AV.

In another example, when the AV is connected to the following AV, the one or more computing agent units transition to a "connected to the following AV" state. Thus, if the communication between the AV and the operation server is lost, the AV can send and receive data (e.g., commands or any other data) to and from the following AV.

In another example, when the AV is connected to the operation server, the one or more computing agent units transition to a "connected to the operation server" state. Thus, if the communication between the AV and the following AV is lost, the AV can send and receive data (e.g., commands or any other data) to and from the operation server.

In other example, if connections between the AV and both of the operation server and the following AV are lost, the one or more computing agent units transition to a "executing a command without connections with the operation server and following AV" state. In this state, the control device associated with the AV pulls the AV over to a side of a road until the communication with either or both of the operation server and the following AV is reestablished.

In this manner, the disclosed system may improve data communication with the AVs, tracking the AVs, and monitoring autonomous operations of the AVs.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, previous technologies fail to provide efficient, reliable, and safe solutions for determining and communicating commands to AVs to avoid unexpected road conditions. This disclosure provides various systems, methods, and devices for 1) communicating a command to a traveling AV to avoid an unexpected road condition; 2) improving data communication with the AV; 3) improving navigation of the AV; 4) improving tracking of the AV; 5) improving monitoring of the autonomous operations of the AV; and 6) providing a safe driving experience for the AV, other vehicles, and pedestrians.

Figure 1:
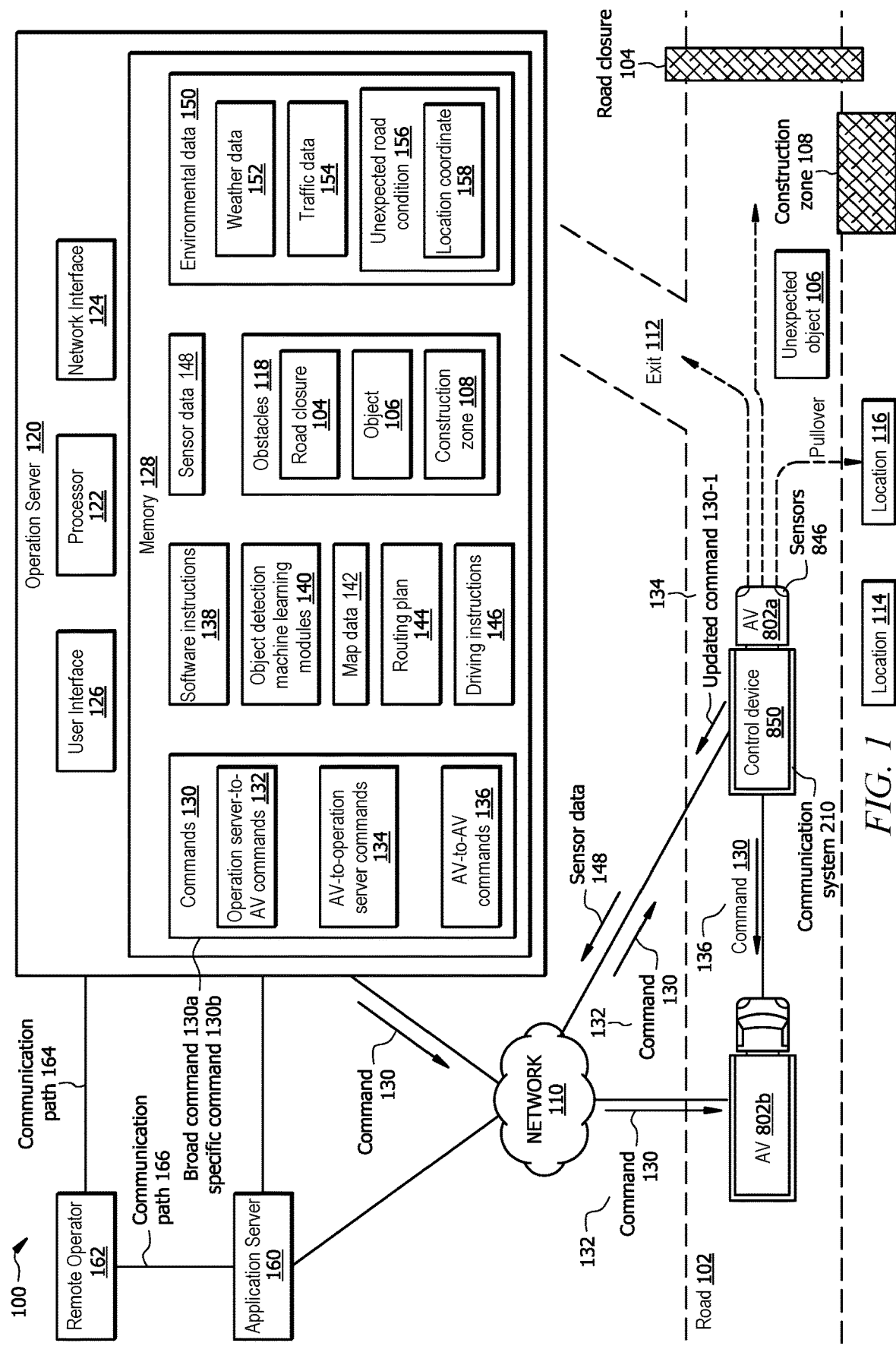
FIG. 1 illustrates an embodiment of a system configured to communicate commands among one or more autonomous vehicle (AVs) and an operation server.
Figure 2:
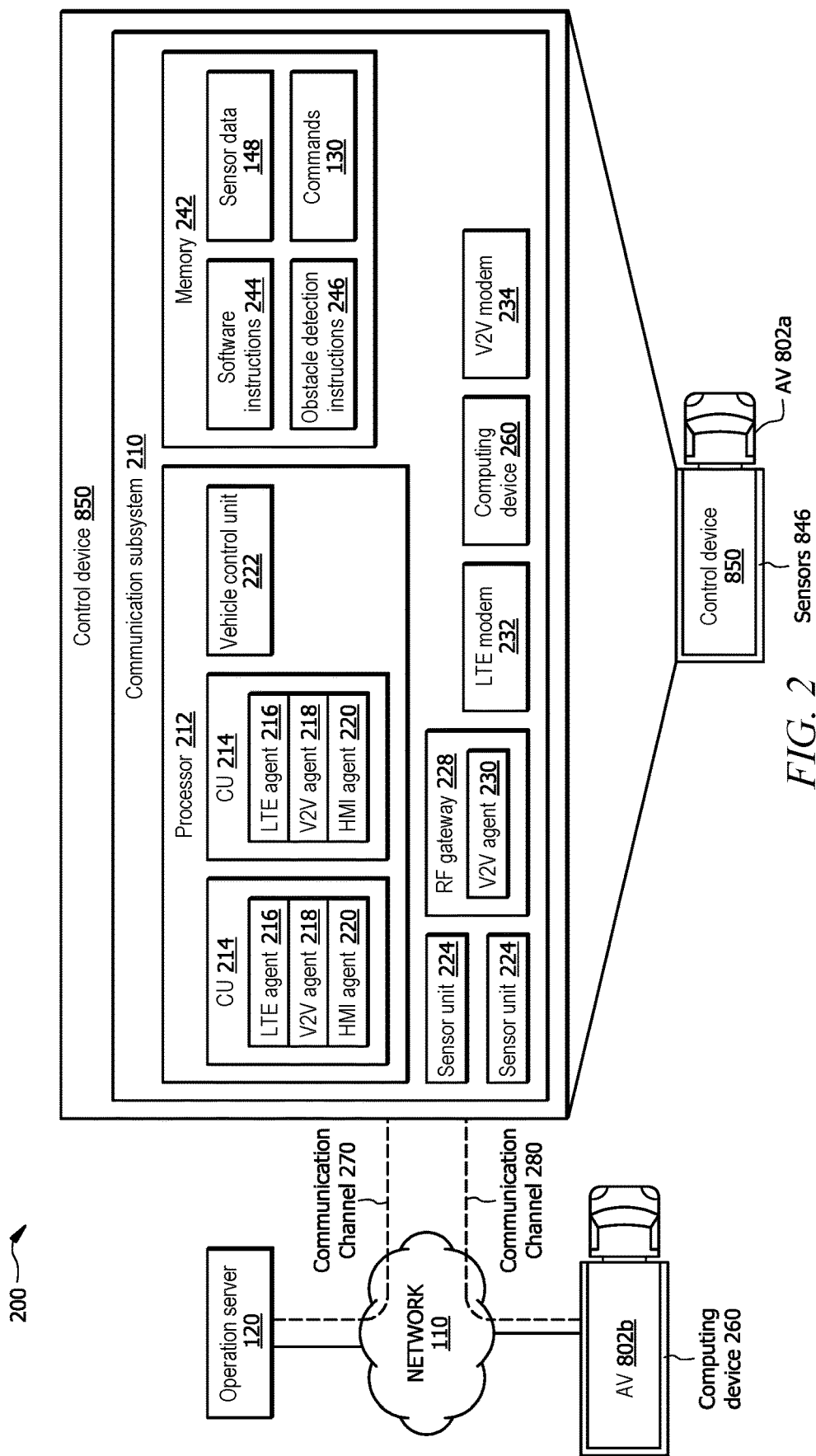
FIG. 2 illustrates an embodiment of a system configured to communicate, from an AV, commands to the operation server and/or a following AV.
Figure 3:
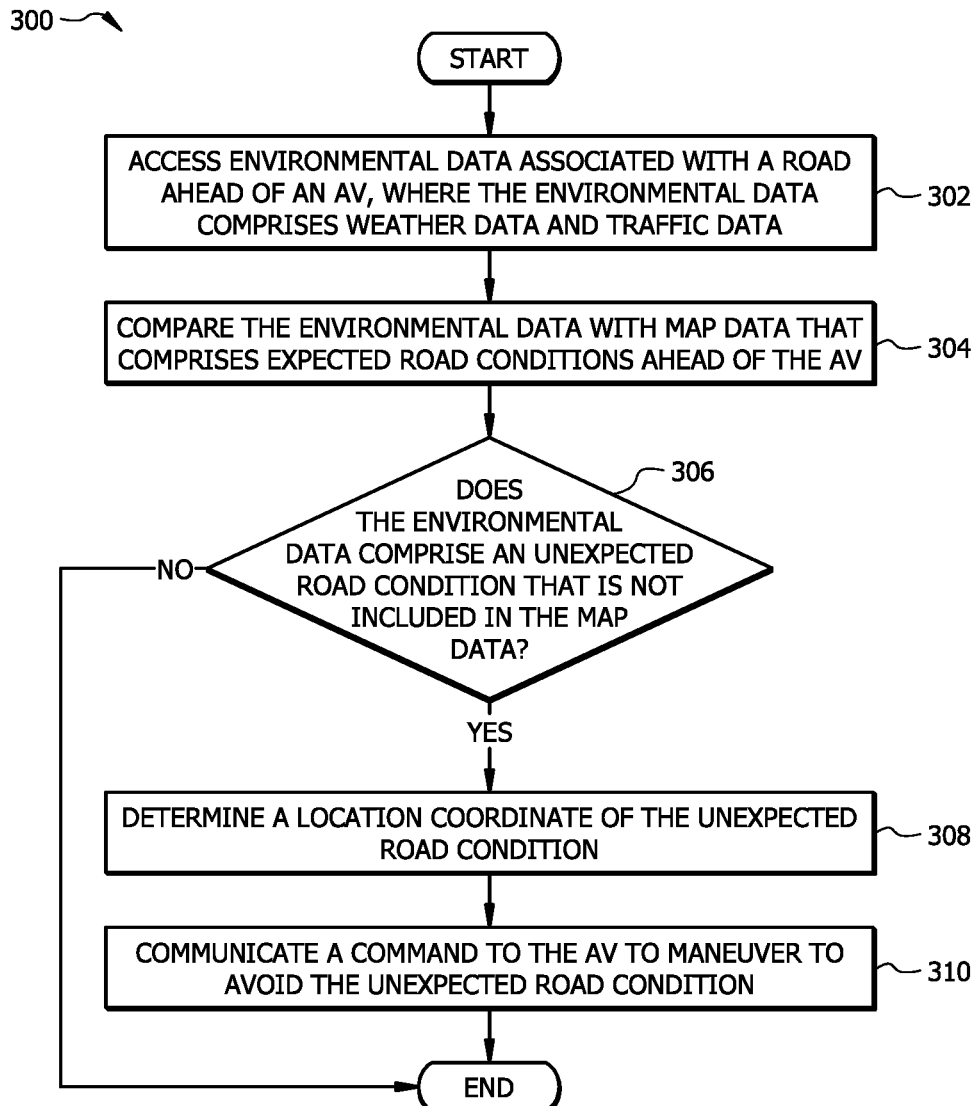
FIG. 3 illustrates an example flowchart of a method for communicating commands among one or more AVs and the operation server.

In one embodiment, a system 100 and a method 300 for communicating commands among an operations server and one or more AVs are described herein with respect to FIGS. 1 and 3, respectively. In one embodiment, a system 200 and a method 400 for receiving commands, by an AV, from the operation server and/or a following AV are described herein with respect to FIGS. 2 and 4, respectively. In one embodiment, systems 500 and 600, and method 700 for communicating commands among AVs are described herein with respect to FIGS. 5-7, respectively. In one embodiment, an example AV and its various systems and devices for implementing autonomous driving operations by the AV are described herein with respect to FIGS. 8-10.

Example System for Communicating Commands Among an Operation Server and One or More AVs FIG. 1 illustrates an embodiment of a system 100 for communicating commands 130 among an operation server 120 and one or more AVs 802. FIG. 1 further illustrates a simplified schematic diagram of a road 102 traveled by the one or more AVs 802, such as the AV 802a and a following AV 802b, where the one or more AVs 802 are headed toward various exemplary unexpected road conditions 156. In one embodiment, system 100 comprises the operation server 120 and one or more AVs 802 (see FIG. 8 for further description of an AV 802). System 100 may further comprise an application server 160, a remote operator 162, and a network 110. Network 110 provides communication paths among components of the system 100. The system 100 may be configured as shown or in any other suitable configurations.

In general, system 100 (at the operation server 120) accesses environmental data 150 comprising weather data 152 and traffic data 154 that provides information about the conditions of the road 102. The environmental data 150 may further comprise road safety regulation data, data related to obstacles 118 (e.g., location coordinates, shapes, sizes, and types of a road closure 104, object(s) 106, construction zone(s) 108, etc.), among others. For example, the operation server 120 receives the environmental data 150 from one or more external sources, such as live weather reporting, live traffic reporting, etc. The operation server 120 (via processor 122) compares the environmental data 150 with map data 142 that comprises expected road conditions ahead of the AV 802a. The expected road conditions may comprise predicted weather conditions and traffic congestions ahead of the AV 802a on the road 102. The expected road conditions may further comprise expected road safety data associated with the road 102, expected road elevation data (e.g., elevation information of different road segments), information related to expected objects ahead of the AV 802a (e.g., location coordinates, shapes, sizes, and types of lane markings, road signs, traffic lights, crosswalks, etc.), historical driving information of one or more AVs 802 on the road 102, among others. Based on comparing the environmental data 150 and the map data 142, the operation server 120 determines whether the environmental data 150 comprises an unexpected road condition 156 that is not included in the map data 142. For example, the unexpected road conditions 156 may comprise unexpected weather conditions, unexpected traffic congestions, unexpected road closure 104, unexpected object(s) 106, unexpected construction zone(s) 108, or any other unexpected road condition 156 that is not included in the map data 142. In response to determining that the environmental data 150 comprises an unexpected road condition 156, the operation server 120 determines a location coordinate 158 of the unexpected road condition 156, and communicates a command 130 to the AVs 802a to maneuver to avoid the unexpected road condition 156. The corresponding description below comprises a brief description of certain components of the system 100.

System Components

Network 110 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 110 may be configured to support any suitable type of communication protocol as would be appreciated by one of ordinary skill in the art.

Operation server 120 is generally configured to oversee the operations of the AV 802. The operation server 120 comprises a processor 122, a network interface 124, a user interface 126, and a memory 128. The components of the operation server 120 are operably coupled to each other.

The processor 122 may include one or more processing units that perform various functions as described herein. The memory 128 stores any data and/or instructions used by the processor 122 to perform its functions. For example, the memory 128 stores software instructions 138 that when executed by the processor 122 causes the operation server 120 to perform one or more functions described herein.

The operation server 120 is in signal communication with the AV 802 and its components. The operation server 120 is further configured to detect objects on and around a road 102 by analyzing the sensor data 148. For example, the operation server 120 may detect objects on and around a road 102 by implementing object detection machine learning modules 140. The object detection machine learning module 140 may be implemented using neural networks and/or machine learning algorithms for detecting objects from images, videos, infrared images, point clouds, radar data, etc. The object detection machine learning module 140 is described in more detail further below.

Figure 8:
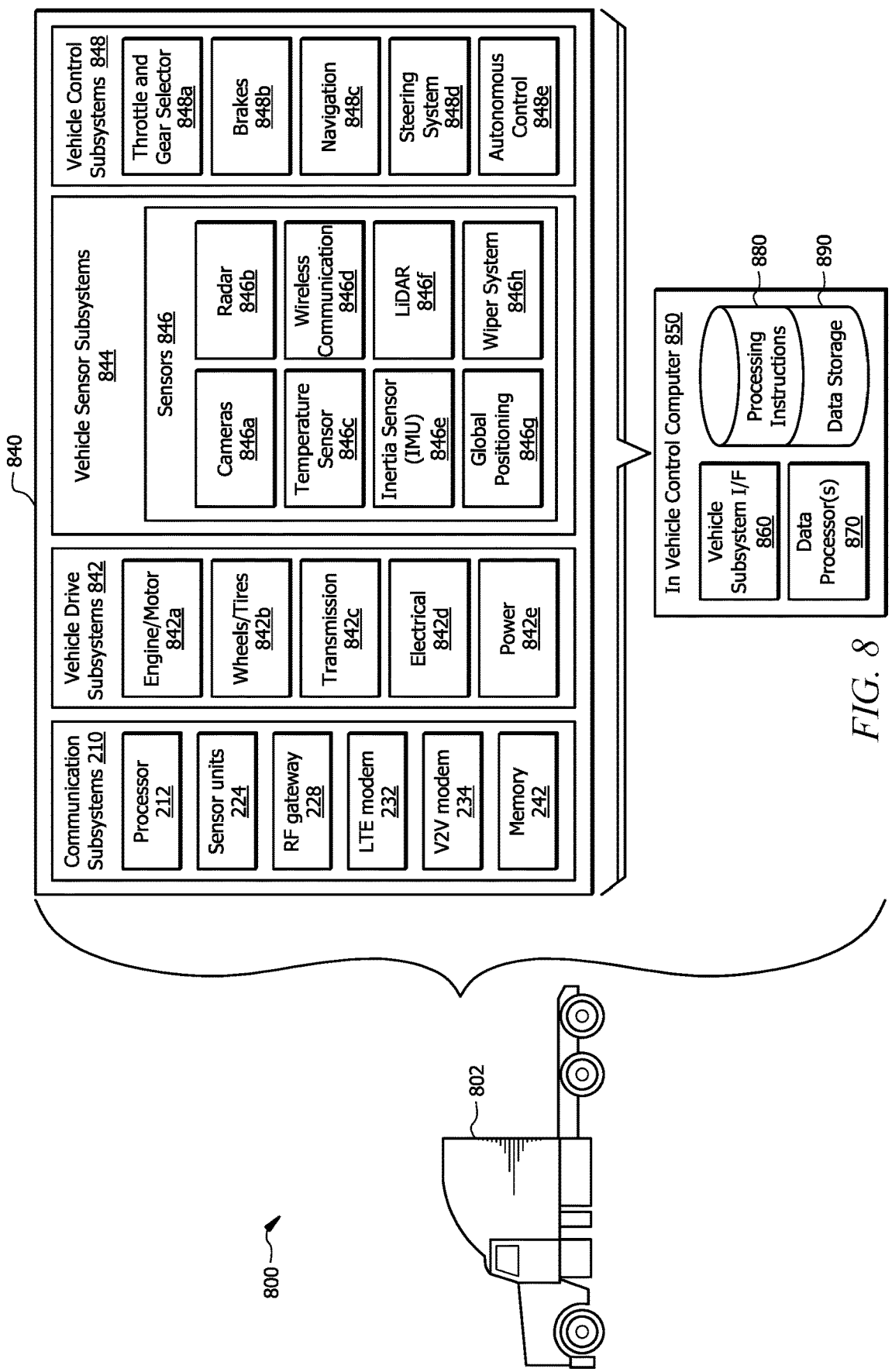
FIG. 8 illustrates a block diagram of an example autonomous vehicle configured to implement autonomous driving operations.

In one embodiment, the AV 802 may include a semi-truck tractor unit attached to a trailer to transport cargo or freight from one location to another location (see FIG. 8). The AV 802 is navigated by a plurality of components described in detail in FIGS. 8-10. The operation of the AV 802 is described in greater detail in FIG. 8. The corresponding description below includes brief descriptions of certain components of the AV 802. In brief, the AV 802 includes an in-vehicle control computer 850 which is operated to facilitate autonomous driving of the AV 802. In this disclosure, the in-vehicle control computer 850 may be interchangeably referred to as a control device 850.

Control device 850 is generally configured to control the operation of the AV 802 and its components. The control device 850 is further configured to determine a pathway in front of the AV 802 that is safe to travel and free of objects/obstacles, and navigate the AV 802 to travel in that pathway. This process is described in more detail in FIGS. 8-10. The control device 850 generally includes one or more computing devices in signal communication with other components of the AV 802 (see FIG. 8). The control device 850 receives sensor data 148 from one or more sensors 846 positioned on the AV 802 to determine a safe pathway to travel. The sensor data 148 includes data captured by the sensors 846. Sensors 846 are configured to capture any object within their detection zones or fields of view, such as landmarks, lane markings, lane boundaries, road boundaries, vehicles, pedestrians, road/traffic signs, among others. The sensors 846 may include cameras, LiDAR sensors, motion sensors, infrared sensors, and the like. In one embodiment, the sensors 846 may be positioned around the AV 802 to capture the environment surrounding the AV 802.

The control device 850 is in signal communication with the operation server 120. The control device 850 is configured to communicate the sensor data 148 to the operation server 120, for example, via network 110. The control device 850 may communicate the sensor data 148 to the operation server 120 periodically (e.g., every minute, every few minutes, or any other suitable interval), continuously, and/or upon receiving a request from the operation server 120 to send sensor data 148. The sensor data 148 may include data describing the environment surrounding the AV 802, such as image feed, video feed, LiDAR data feed, and other data captured from the fields of view of the sensors 846. The sensor data 148 may further include location coordinates of the AV 802. See the corresponding description of FIG. 8 for further description of the control device 850.

Communication subsystem 210 is a component of the control device 850, and is generally configured to establish communication between the AV 802*a* and the operation server 120 and/or the following AV 802*b*. The communication subsystem 210 is further configured to receive commands 130 or other suitable communications from the operation server 120 and/or the following AV 802*b*. Upon receiving a command 130, the communication subsystem 210 (or the control device 850) may implement the command 130 or update the command 130 before implementing. See the corresponding description of FIG. 2 for further description of the communication subsystem 210. The corresponding description below describes various examples of commands 130.

Example Commands

Commands 130 generally comprise one or more instructions that may be used to navigate and/or configure one or more AVs 802. For example, the commands 130 may include, but are not limited to instructions to: 1) transition, by an AV 802, from autonomous driving to manual driving; 2) avoid, by an AV 802, obstacles 118 (e.g., road closures 104, objects 106, construction zones 108, etc.); 3) avoid, by an AV 802, one or more certain lanes (e.g., lanes occupied by an obstacle 118, etc.); 4) avoid, by an AV 802, one or more certain routing plans 144 on which unexpected road conditions 156 or obstacles 118 are detected; 5) take, by an AV 802, a certain re-route (e.g., by taking an exit 112); 6) operate, by an AV 802, in a manner different than driving instructions 146 (e.g., driving slower or faster than the speed indicated in the driving instruction 146).

In some cases, a command 130 may be a configuration command 130 that is related to aspects other than navigating the AV 802. For example, a configuration command 130 may be related to changing sensor parameters, including changing a direction of a sensor 846 (e.g., tilting a direction of a sensor 846), changing a data sampling frequency of a sensor 846, etc.

The commands 130 may comprise operation server-to-AV commands 132, AV-to-operation server commands 134, and AV-to-AV commands 136. The operation server-to-AV commands 132 are commands 130 that the operation server 120 communicates to one or more AVs 802. The AV-to-operation server commands 134 are commands 130 that an AV 802 communicates to the operation server 120. The AV-to-AV commands 136 are commands 130 that a first AV 802 (e.g., AV 802*a*) communicates to a second AV 802 (e.g., AV 802*b*) directly or indirectly through the operation server 120.

In one embodiment, the remote operator 162 may determine and issue the commands 130 from the operation server 120. The remote operator 162 may be an individual who is associated with and has access to the operation server 120. For example, the remote operator 162 may be an administrator that can access and view the information regarding the AV 802, such as data available on the memory 128. The remote operator 162 may access the operation server 120 directly or indirectly. For example, the remote operator 162 may directly access the operation server 120 through a communication path 164. By reviewing the operation server 120 and reviewing the environmental data 150, map data 142, routing plans 144, and sensor data 148 on the user interface 126 of the operation server 120, the remote operator 162 may issue a command 130 for one or more AVs 802. In another example, the remote operator 162 may indirectly access the operation server 120 from the application server 160 that is acting as a presentation layer via the network 110. The operation server 120 may forward or communicate the command 130 to the one or more AVs 802.

In another embodiment, the process of determining and issuing commands 130 may be computerized and performed by the operation server 120 and/or the control device 850.

The commands 130 may have different levels of granularity. For example, different granularity levels of commands 130 may indicate whether a command 130 is a broad command 130*a* or a specific command 130*b*, as described below.

The commands 130, including broad commands 130*a* and specific commands 130*b* described herein, are exemplary and are not meant to limit the scope of the invention as otherwise presented or set forth in the claims attached hereto.

Broad Command Examples

A broad command 130*a* may be related to a particular unexpected road condition 156 that applies to one or more AVs 802 generally. The broad command 130*a* may be directed to one or more AVs 802, for example, on a particular road 102 that are headed toward the particular unexpected road condition 156. As illustrated in FIG. 1, the AVs 802 are traveling along the road 102, where the AV 802*a* is ahead of the AV 802*b*, and the AVs 802 may encounter different unexpected road conditions 156. For each unexpected road condition 156, the operation server 120 may issue a particular command 130 (i.e., an operation server-to-AV command 132), as described below.

For example, the operation server 120 may communicate a broad command 130*a* to one or more AVs 802 indicating that there is a road closure 104 on the road 102, and to find another routing plan 144 (e.g., a routing plan 144 that provides the safest driving experience) to reach the destination. In another example, the operation server 120 may communicate a broad command 130*a* to one or more AVs 802 indicating that severe weather is detected (e.g., based on the weather data 152) on the road 102 ahead of the lead AV 802*a*, and to find a next exit (e.g., exit 112), and pull over. In another example, the operation server 120 may communicate a broad command 130*a* to one or more AVs 802 indicating that an unexpected object 106 (that is not detected in the map data 142) is detected on the road 102, and to navigate around the unexpected object 106. In another example, the operation server 120 may communicate a broad command 130a to one or more AVs 802 indicating that an unexpected construction zone 108 (that is not detected in the map data 142) is detected on the road 102, and find a spot on a side of the road 102 to pull over.

Specific Command Examples

A specific command 130b may be related to a specific unexpected road condition 156 that applies to a particular AV 802. The specific command 130b may be directed to a particular AV 802 that is encountering the specific unexpected road condition 156. For example, the operation server 120 may communicate a specific command 130b to AV 802a that there is a road closure 104 on the road 102, and to take the next exit 112, make a first right turn after the stop light, drive fifty feet, pull over on a side of a road, and await for further instructions. In another example, assume that the AV 802a has pulled over on a side of the road 102, however, the AV 802a is stopped two feet onto a side lane. The operation server 120 may communicate a specific command 130b to the AV 802a to turn the steering wheel to the right for two seconds, move at a speed of two miles per hour (mph), and stop. In another example, a specific command 130b may be providing turn-by-turn instructions to the particular AV 802a without taking over autonomous driving of the AV 802a.

The control device 850 and/or the operation server 120 may use the broad commands 130a and specific commands 130b as a training dataset to learn associations and relationships between each unexpected road condition 156 and its corresponding issued command 130. Thus, the control device 850 and/or the operation server 120 may be trained to issue commands 130 with minimum (or without) human intervention (i.e., interventions from the remote operator 162).

Operation Server

Aspects of an embodiment of the operation server 120 are described above, and additional aspects are provided below. The operation server 120 includes at least one processor 122, at least one network interface 124, at least one user interface 126, and at least one memory 128. The operation server 120 may be configured as shown or in any other suitable configuration.

In one embodiment, the operation server 120 may be implemented by a cluster of computing devices that may serve to oversee the operations of the AV 802. For example, the operation server 120 may be implemented by a plurality of computing devices using distributed computing and/or cloud computing systems. In another example, the operation server 120 may be implemented by a plurality of computing devices in one or more data centers. As such, in one embodiment, the operation server 120 may include more processing power than the control device 850. The operation server 120 is in signal communication with one or more AVs 802 and their components (e.g., the control device 850). In one embodiment, the operation server 120 is configured to determine a particular routing plan 144 for the AV 802. For example, the operation server 120 may determine a particular routing plan 144 for an AV 802 that leads to reduced driving time and a safer driving experience for reaching the destination of that AV 802.

In one embodiment, in cases where an unexpected road condition 156 is detected by comparing the environmental data 150 and map data 142, the operation server 120 may evaluate the environmental data 150 and map data 142, and determine a command 130 to navigate the AV 802. For example, in response to detecting a specific unexpected road condition 156, the operation server 120 may determine and communicate a command 130 to the AV 802 to avoid the unexpected road condition 156. In one embodiment, the remote operator 162 may confirm, modify, and/or override the suggested command 130 (or navigation plan) of the operation server 120, as described below.

In one embodiment, the navigating solutions or routing plans 144 for the AV 802 may be determined from V2V communications, such as one AV 802 with another. In one embodiment, the navigating solutions or routing plans 144 for the AV 802 may be determined from Vehicle-to-Cloud (V2C) communications, such as the AV 802 with the operation server 120.

In one embodiment, the commands 130, navigating solutions, and/or routing plans 144 for the AV 802 may be determined by Vehicle-to-Cloud-to-Human (V2C2H), Vehicle-to-Human (V2H), Vehicle-to-Cloud-to-Vehicle (V2C2V), and/or Vehicle-to-Human-to-Vehicle (V2H2V) communications, where human intervention is incorporated in determining navigating solutions for the AV 802. For example, the remote operator 162 may review the environmental data 150 and map data 142 from the user interface 126 and confirm, modify, and/or override the command 130 for the AV 802 determined by the operation server 120 and/or the control device 850. The remote operator 162 may add a human perspective in determining the navigation plan of the AV 802 that the control device 850 and/or the operation server 120 otherwise do not provide. In some instances, the human perspective is more preferable compared to machine's perspectives in terms of safety, fuel-saving, etc.

In one embodiment, the commands 130 for the AV 802 may be determined by any combination of V2V, V2C, V2C2H, V2H, V2C2V, V2H2V communications, among other types of communications.

As illustrated in FIG. 1, the remote operator 162 can access the application server 160 via communication path 166, and similarly, access the operation server 120 via communication path 164. In one embodiment, the operation server 120 may send the sensor data 148, commands 130, environmental data 150, and/or any other data/instructions to an application server 160 to be reviewed by the remote operator 162, e.g., wirelessly through network 110 and/or via wired communication. As such, in one embodiment, the remote operator 162 can remotely access the operation server 120 via the application server 160.

Processor 122 comprises one or more processors operably coupled to the memory 128. The processor 122 is any electronic circuitry including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 122 may be a programmable logic device, a microcontroller, a microprocessor, or any suitable combination of the preceding. The processor 122 is communicatively coupled to and in signal communication with the network interface 124, user interface 126, and memory 128. The one or more processors are configured to process data and may be implemented in hardware or software. For example, the processor 122 may be 8-bit, 16-bit, 32-bit, 64-bit or of any other suitable architecture. The processor 122 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute software instructions 138 to implement the functions disclosed herein, such as some or all of those described with respect to FIGS. 1-7. In some embodiments, the function described herein is implemented using logic units, FPGAs, ASICs, DSPs, or any other suitable hardware or electronic circuitry.

Network interface 124 is configured to enable wired and/or wireless communications. The network interface 124 is configured to communicate data between the operation server 120 and other network devices, systems, or domain(s). For example, the network interface 124 may comprise a WIFI interface, a local area network (LAN) interface, a wide area network (WAN) interface, a modem, a switch, or a router. The processor 122 is configured to send and receive data using the network interface 124. The network interface 124 may be configured to use any suitable type of communication protocol.

User interfaces 126 may include one or more user interfaces that are configured to interact with users, such as the remote operator 162. The remote operator 162 may access the operation server 120 via the communication path 164. The user interfaces 126 may include peripherals of the operation server 120, such as monitors, keyboards, mouse, trackpads, touchpads, etc. The remote operator 162 may use the user interfaces 126 to access the memory 128 to review sensor data 148, environmental data 150, unexpected road conditions 156, and other data stored on the memory 128.

Memory 128 stores any of the information described in FIGS. 1-7 along with any other data, instructions, logic, rules, or code operable to implement the function(s) described herein when executed by processor 122. For example, the memory 128 may store commands 130, software instructions 138, object detection machine learning modules 140, map data 142, routing plan 144, driving instructions 146, sensor data 148, environmental data 150, unexpected road conditions 156, location coordinates 158 for the unexpected road conditions, obstacles 118, and/or any other data/instructions. The software instructions 138 include code that when executed by the processor 122 causes the operation server 120 to perform the functions described herein, such as some or all of those described in FIGS. 1-7. The memory 128 comprises one or more disks, tape drives, or solid-state drives, and may be used as an over-flow data storage device, to store programs when such programs are selected for execution, and to store instructions and data that are read during program execution. The memory 128 may be volatile or non-volatile and may comprise read-only memory (ROM), random-access memory (RAM), ternary content-addressable memory (TCAM), dynamic random-access memory (DRAM), and static random-access memory (SRAM). The memory 128 may include one or more of a local database, cloud database, network-attached storage (NAS), etc.

Object detection machine learning modules 140 may be implemented by the processor 122 executing software instructions 138, and is generally configured to detect objects or obstacles 118, including the road closure 104, unexpected object 106, and construction zone 108, from the sensor data 148. The object detection machine learning modules 140 may be implemented using neural networks and/or machine learning algorithms for detecting objects from any data type, such as images, videos, infrared images, point clouds, Radar data, etc.

In one embodiment, the object detection machine learning modules 140 may be implemented using machine learning algorithms, such as Support Vector Machine (SVM), Naive Bayes, Logistic Regression, k-Nearest Neighbors, Decision Trees, or the like. In one embodiment, the object detection machine learning modules 140 may utilize a plurality of neural network layers, convolutional neural network layers, and/or the like, in which weights and biases of these layers are optimized in the training process of the object detection machine learning modules 140. The object detection machine learning modules 140 may be trained by a training dataset which includes samples of data types labeled with one or more objects in each sample. For example, the training dataset may include sample images of objects (e.g., vehicles, lane markings, pedestrian, road signs, obstacles 118, etc.) labeled with object(s) in each sample image. Similarly, the training dataset may include samples of other data types, such as videos, infrared images, point clouds, Radar data, etc. labeled with object(s) in each sample data. The object detection machine learning modules 140 may be trained, tested, and refined by the training dataset and the sensor data 148. The object detection machine learning modules 140 use the sensor data 148 (which are not labeled with objects) to increase their accuracy of predictions in detecting objects. For example, supervised and/or unsupervised machine learning algorithms may be used to validate the predictions of the object detection machine learning modules 140 in detecting objects in the sensor data 148.

Map data 142 may include a virtual map of a city or an area which includes the road 102. In some examples, the map data 142 may include the map 958 and map database 936 (see FIG. 9 for descriptions of the map 958 and map database 936). The map data 142 may include drivable areas, such as roads 102, paths, highways, and undrivable areas, such as terrain (determined by the occupancy grid module 960, see FIG. 9 for descriptions of the occupancy grid module 960). The map data 142 may specify location coordinates of road signs, lanes, lane markings, lane boundaries, road boundaries, traffic lights, obstacles 118, etc.

Routing plan 144 is a plan for traveling from a start location (e.g., a first AV launchpad/landing pad) to a destination (e.g., a second AV launchpad/landing pad). For example, the routing plan 144 may specify a combination of one or more streets, roads, and highways in a specific order from the start location to the destination. The routing plan 144 may specify stages including the first stage (e.g., moving out from the start location), a plurality of intermediate stages (e.g., traveling along particular lanes of one or more particular street/road/highway), and the last stage (e.g., entering the destination). The routing plan 144 may include other information about the route from the start position to the destination, such as road/traffic signs in that routing plan 144, etc.

Figure 9:
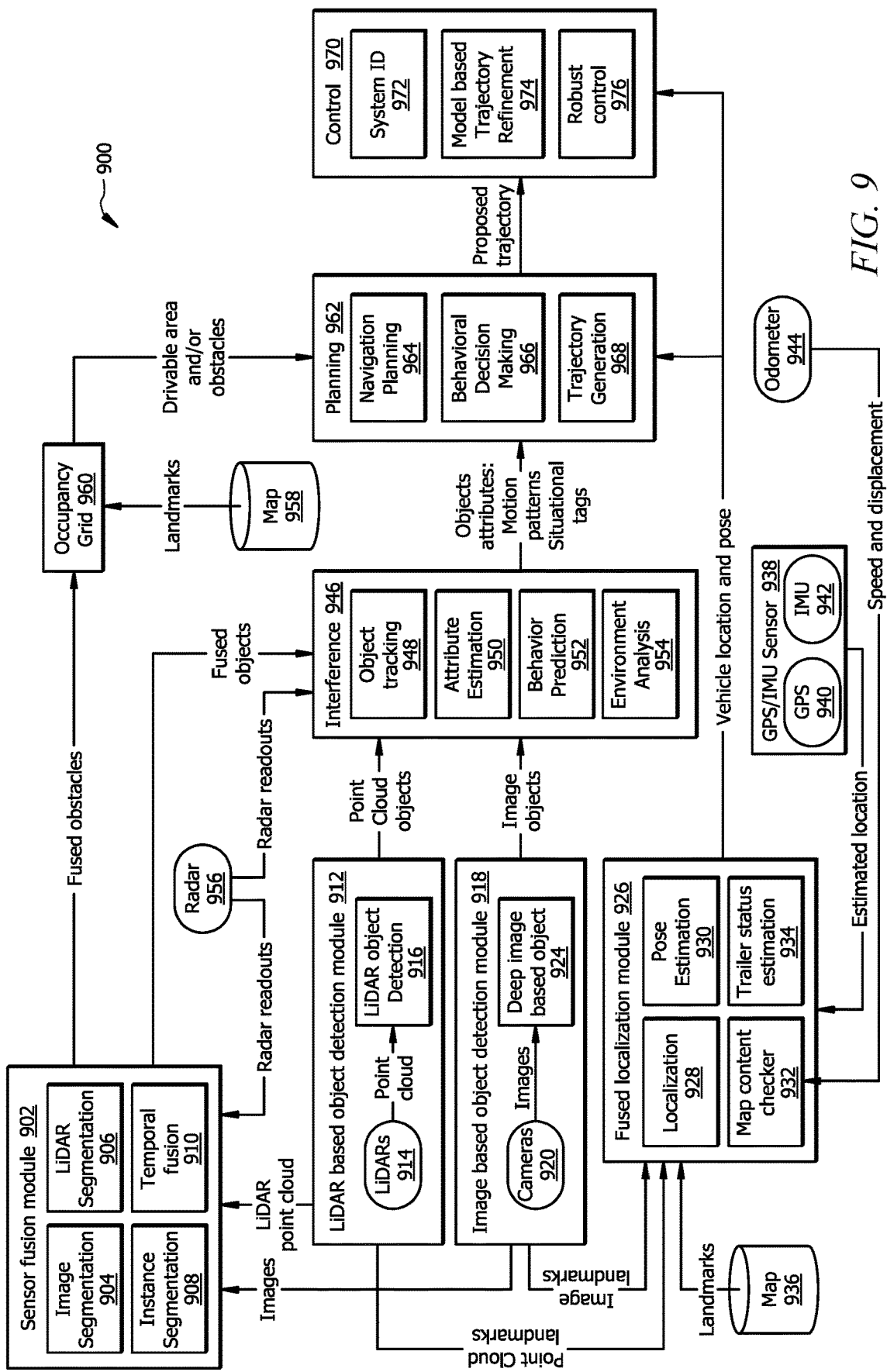
FIG. 9 illustrates an example system for providing autonomous driving operations used by the AV of FIG. 8.

Driving instructions 146 may be implemented by the planning module 962 (See descriptions of the planning module 962 in FIG. 9). The driving instructions 146 may include instructions and rules to adapt the autonomous driving of the AV 802 according to the driving rules of each stage of the routing plan 144. For example, the driving instructions 146 may include instructions to stay within the speed range of a road 102 traveled by the AV 802, adapt the speed of the AV 802 with respect to observed changes by the sensors 846, such as speeds of surrounding vehicles, objects within the detection zones of the sensors 846, etc.

Environmental data 150 may include weather data 152 and traffic data 154 that provide information about conditions of the road 102. Weather data 152 may include weather information of regions or areas ahead of the AV 802. For example, the weather data 152 may be accessed from weather forecasting servers, live weather reporting, etc. The environmental data 150 may further comprise road safety regulation data, data related to obstacles 118 (e.g., location coordinates, shapes, sizes, and types of a road closure 104, object(s) 106, construction zone(s) 108, etc.), among others.

Traffic data 154 may include traffic data of roads/streets/highways in the map data 142. The operation server 120 may use traffic data 154 gathered by one or more mapping vehicles. The operation server 120 may use traffic data 154 that is captured from any source, such as crowd-sourced traffic data 154 captured from external sources, e.g., Waze® and Google Map®, live traffic reporting, etc.

Application Server

The application server 160 is generally any computing device configured to communicate with other devices, such as other servers (e.g., operation server 120), AVs 802, databases, etc., via the network 110. The application server 160 is configured to perform functions described herein and interact with the remote operator 162, e.g., via communication path 166 using its user interfaces. Examples of the application server 160 include, but are not limited to, desktop computers, laptop computers, servers, etc. In one example, the application server 160 may act as a presentation layer from which the remote operator 162 accesses the operation server 120. As such, the operation server 120 may send sensor data 148, commands 130, environmental data 150, and/or any other data/instructions to the application server 160, e.g., via the network 110. The remote operator 162, after establishing the communication path 166 with the application server 160, may review the received data and confirm, modify, and/or override the suggested command 130 determined by the operation server 120, as described below.

Operational Flow

Communicating a Command from the Operation Server to an AV

The operational flow for communicating a command 130 from the operation server 120 to an AV 802 may begin when an unexpected road condition 156 is detected in the environmental data 150. For example, the operation server 120 (and/or the remote operator 162) may detect that the environmental data 150 comprises an unexpected road condition 156 by reviewing the environmental data 150, and comparing the environmental data 150 with the map data 142 that comprises expected road conditions ahead of the AV 802 (e.g., AV 802a). The environmental data 150 may comprise weather data 152 and traffic data 154 in a time window during which the AV 802 (e.g., AV 802a) is traveling along the road 102.

Based on comparing the environmental data 150 with the map data 142, the operation server 120 (and/or the remote operator 162) determines whether the environmental data 150 comprises an unexpected road condition 156 that is not included in the map data 142. Examples of the unexpected road conditions 156 are described above.

In response to determining that the environmental data 150 comprises the unexpected road condition 156, the operation server 120 (and/or the remote operator 162) may determine a location coordinate 158 of the unexpected road condition 156, and communicate a command 130 (i.e., an operation server-to-AV command 132) to the AV 802a to maneuver to avoid the unexpected road condition 156.

Communicating a Command from an AV to the Operation Server

In one embodiment, in response to receiving the command 130 from the operation server 120, the control device 850 (e.g., via the communication subsystem 210) may navigate the AV 802a according to the command 130.

In an alternative embodiment, the control device 850 (e.g., via the communication subsystem 210) may update the command 130. For example, in some cases, the operation server 120 (and/or the remote operator 162) may not have access to (or may have not yet received) the sensor data 148, and determine the command 130 based on comparing the environmental data 150 and map data 142. As such, in some cases, the command 130 may not be an optimal navigation solution for the AV 802a. In such cases, the control device 850 may update the command 130 based on analyzing the sensor data 148.

To this end, the control device 850 receives the sensor data 148 from the sensor 846. By processing the sensor data 148, the control device 850 may determine location coordinates of a plurality of objects on and around the road 102. The control device 850 may update the command 130, such that the updated command 130-1 comprises one or more instructions to avoid the plurality of objects on and around the road 102 while performing the command 130.

For example, assume that the road 102 is closed by the road closure 104. Also assume that the road closure 104 is out of the field-of-view or detection zone of the sensors 846 of the AV 802a. The operation server 120 may access environmental data 150 indicating that the road 102 is closed by the road closure 104. From the environmental data 150, the operation server 120 (and/or the remote operator 162) determines the location coordinate of the road closure 104.

The operation server 120 (and/or the remote operator 162) may issue a command 130 to the AV 802a that the road 102 is closed ahead, and to pull over on a side of the road 102 at a location 114. The control device 850 (e.g., via the communication subsystem 210) receives the command 130 from the operation server 120. The control device 850 (e.g., via the communication subsystem 210) also receives the sensor data 148 from the sensors 846. By processing the sensor data 148, the control device 850 (e.g., via the communication subsystem 210) may determine that the particular location 114 is occupied by an obstacle. In this case, the control device 850 (e.g., via the communication subsystem 210) may update the command 130 to avoid the obstacle on the particular location 114. For example, by processing sensor data 148, the control device 850 may determine that the location coordinate 116 is free of obstacles, and update the command 130 to pull the AV 802a over to the location 116 instead of the location 114 as indicated by the command 130.

In one embodiment, the control device 850 may perform the updated command 130-1. For example, the control device 850 may navigate the AV 802a according to the updated command 130-1.

In an alternative embodiment, the control device 850 may communicate the sensor data 148 and the updated command 130-1 (i.e., an AV-to-operation server command 134) to the operation server 120, and await a confirmation to perform the updated command 130. Upon receiving the sensor data 148 and the updated command 130-1, the operation server 120 (and/or the remote operator 162) may analyze the received data, and confirm, revise, or override the updated command 130-1. The operation server 130 may then communicate the decision of the operation server 120 (and/or the remote operator 162) to the AV 802a.

Instigating Communicating a Command from an AV to the Operation Server

In some cases, the control device 850 (e.g., via the communication subsystem 210) may instigate communicating a proposed command 130 (i.e., an AV-to-operation server command 134) for navigating the AV 802a to the operation server 120. For example, assume that sensors 846 detect an obstacle 118 on the road 102. For example, the obstacle 118 may be any of a road closure 104, an object 106, and a construction zone 108. Thus, the sensor data 148 may include indications representing the presence of the obstacle 118 on the road 102.

The control device 850 analyzes the sensor data 148, and determines the presence of the obstacle 118 on the road 102. The control device 850 compares the sensor data 148 with the map data 142 that includes location coordinates of expected objects on and around the road 102. Based on comparing the sensor data 148 and map data 142, the control device 850 determines that the obstacle 118 is not included in the map data 142. In response, the control device 850 may determine a proposed command 130 or a proposed navigation instruction for the AV 802a to avoid the obstacle 118. For example, the proposed command 130 may include pulling over, diverting to another lane that is not occupied by the obstacle 118, re-routing, etc.

In one embodiment, the control device 850 may perform the proposed command 130.

In an alternative embodiment, the control device 850 may communicate the proposed command 130 (i.e., an AV-to-operation server command 134 (see FIG. 1)) to the operation server 120 for confirmation or revision by the operation server 120 (and/or the remote operator 162), as described above.

The control device 850 may determine whether the confirmation or revision is received from the operation server 120. In response to receiving a confirmation, the control device 850 performs the proposed command 130. In response to receiving a revision, the control device 850 performs the revised command 130.

In one embodiment, the control device 850 may communicate the sensor data 148 that indicates the presence of the observed obstacle 118, and request the remote operator 162 (and/or the operation server 120) to provide a command 130 to avoid the obstacle 118.

As such, in various embodiments described above, the control device 850 may negotiate with the operation server 120 (and/or the remote operator 162) to determine a more optimal command 130 for navigating the AV 802a in response to detecting different obstacle 118 and/or unexpected road condition 156.

Communicating a Command from an AV to Another AV

In one embodiment, communicating a command 130 from an AV 802 (e.g., AV 802a) to another AV 802 (e.g., AV 802b) may be instigated from the operation server 120. For example, as described above, in response to detecting an unexpected road condition 156 ahead of the AV 802a, the operation server 120 (and/or the remote operator 162) may communicate a command 130 to the AV 802a to maneuver to avoid the unexpected road condition 156. The control device 850 may perform or update the command 130, similar to that described above. This command 130 (or the updated command 130-1) may be propagated to one or more following AVs 802, such as AV 802b. For example, the operation server 120 may communicate the command 130 (or the updated command 130-1) to the AV 802b, informing the AV 802b about the unexpected road condition 156, location coordinate 158 of the unexpected road closure 104, and one or more navigation instructions to avoid the unexpected road condition 156.

In one embodiment, communicating a command 130 from a first AV 802a to a second AV 802b may be instigated from the first AV 802a. For example, in response to detecting an unexpected road condition 156 and/or an obstacle 118, the control device 850 (e.g., via the communication subsystem 210) may determine a proposed command 130 to navigate the first AV 802a, similar to that described above. The control device 850 (e.g., via the communication subsystem 210) may communicate the command 130 to the second AV 802b directly, for example, if the second AV 802b is within a V2V communication range of the first AV 802a. This process is described in more detail in FIG. 2, and various scenarios of communicating commands 130 among AVs 802 are described in FIGS. 5-7.

Example Communications Subsystem and its Operation

FIG. 2 illustrates an embodiment of a system 200 that is configured to establish communications among AVs 802 and operation server 120. In one embodiment, the system 200 comprises a communication subsystem 210 that is a component of the control device 850 (see FIG. 8), AV 802a, and operation server 120. In some embodiments, the system 200 may further comprise an AV 802b and the network 110. Network 110 establishes communication among the components of the system 200. The system 200 may be configured as shown or in any other suitable configurations. Aspects of an embodiment of certain components of the system 200 are described above in FIG. 1, and additional aspects are provided below.

In one embodiment, the network 110 may be implemented using any suitable cloud computing service and network infrastructure, including Amazon Web Services (AWS)®. The network 110 may use any suitable data communication protocol to transport data between devices, including Message Queuing Telemetry Transport (MQTT)®. The network 110 may provide one or more functionalities, including 1) providing secure connections between the operation server 120 and the AVs 802; 2) storing data received from an AV 802 (e.g., AV 802a), such as commands 130, sensor data 148, etc.; 3) providing access to the data communicated between the AV 802a and operation server 120; and 4) transferring data among the AVs 802 and operation server 120.

Control device 850 comprises a plurality of components, including the communication subsystem 210 operably coupled with a computing device 260. Other components of the control device 850 are described in FIG. 8. The corresponding description below describes components of the communication subsystem 210.

Communication subsystem 210 is provided to facilitate data communication between an AV 802 (e.g., AV 802a) and other components of the system 200. In some embodiments, the communication subsystem 210 may include a controller area network (CAN) controller to establish communications among the components within the communication subsystem 210. The communication subsystem 210 may include various components that support the operation of the communication subsystem 210. The communication subsystem 210 includes at least one processor 212 in signal communication with at least one memory 242. Memory 242 stores software instructions 244 that when executed by the processor 212 cause the processor 212 to perform one or more functions described herein. For example, when the software instructions 244 are executed, the processor 212 receives a command 130 from the operation server 120 and/or the following AV 802b, and implements the command 130. In another example, when the software instructions 244 are executed, upon receiving a command 130 from the operation server 120 and/or the following AV 802b, the processor 212 updates the command 130, communicates the updated command 130 to the operation server 120 and/or the following AV 802b, and upon receiving a confirmation (or revision) implements the command 130. The communication subsystem 210 may further comprise at least one sensor unit 224, a Radio Frequency (RF) gateway 228, a Long Term Evolution (LTE) modem 232, and a V2V modem 234.

Processor 212 comprises one or more processors, such as computing units 214 and vehicle control unit 222. The processor 212 is operably coupled to the sensor units 224, RF gateway 228, LTE modem 230, V2V modem 234, and memory 242. The processor 212 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 212 may be a programmable logic device, a microcontroller, a microprocessor, or any suitable combination of the preceding. The processor 212 is configured to process data and may be implemented in hardware and/or software. For example, the processor 212 may be 8-bit, 16-bit, 32-bit, 64-bit or of any other suitable architecture. The processor 212 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute software instructions 244 to implement the functions disclosed herein, such as some or all of those described with respect to FIGS. 1-10. In some embodiments, the function described herein is implemented using logic units, FPGAs, ASICs, DSPs, or any other suitable hardware or electronic circuitry.

Each computing unit 214 may be implemented by the processor 212 executing the software instructions 244, and is generally configured to support autonomous driving functions and facilitate data communication between the AV 802a and other components of the system 200.

In one embodiment, the computing units 214 are redundant backups for each other. The processor 212 may include any suitable number of computing units 214, such as one, two, three, etc. Each computing unit 214 may perform one or more functions of the communication subsystem 210 (or the control device 850) described in FIG. 1, including 1) receiving commands 130, including broad 130a, specific 130b, and configuration commands 130, from the operation server 120 and/or a following AV 802b; 2) sending commands 130 to the operation server 120 and/or the following AV 802b; 3) communicating a location coordinate of the AV 802a to the operation server 120 and/or the following AV 802b; 4) gathering health information of the components (e.g., hardware and software components) of the control device 850, where the health information of a component of the control device 850 indicates a performance status of that component, such as memory utilization percentage, processor utilization percentage, an average response time per second, an average error rate per minute, etc.; and 5) communicating the health information of the components of the control device 850 to the operation server 120 and/or the following AV 802b.

Each computing unit 214 may comprise an LTE agent 216, a V2V agent 218, and a Human Machine Interface (HMI) agent 220.

LTE agent 216 may be implemented in software and/or hardware module, and is generally configured to establish communication between the AV 802a and the operation server 120 via the network 110.

V2V agent 218 may be implemented in software and/or hardware module, and is generally configured to receive commands 130 from the AV 802b, and transmit commands 130 to the following AV 802b using the V2V modem 234.

HMI agent 220 may be a software and/or hardware module, and is generally configured to establish communication with the following AV 802b to provide a visitor mode HMI service, such that an operator is able to access the control device 850 of the AV 802a from the computing device 260 on the AV 802b.

Each sensor unit 224 may be implemented in a software and/or hardware module. For example, each sensor unit 224 may be implemented on one or more microprocessors. Each sensor unit 224 is generally configured to perform one or more functions, including 1) gathering sensor data 148 from one or more sensors 846; 2) generating a timestamp when each sensor data 148 is received; 3) processing the sensor data 148 for detecting objects, e.g., using obstacle detection instructions 246; and 4) sending the processed sensor data 148 to the processor 212.

In one embodiment, the sensor unit 224 may process the sensor data 148 to determine and identify objects indicated in the sensor data 148. For example, to determine or identify objects indicated in the sensor data 148, the sensor unit may use obstruction detection instructions 246. The sensor unit 224 may use the obstruction detection instructions 246 to determine if an object is detected in the sensor data 148 (e.g., in image/video feeds, LiDAR data feeds, motion sensor data feeds, infrared data feeds, etc.). For example, the obstruction detection instructions 246 may include code for implementing object detection methods from the feed of images corresponding to frames of videos (e.g., detecting objects from images or videos). Similarly, the obstruction detection instructions 246 may include code for detecting objects from LiDAR data, motion sensor data (e.g., detecting motions of the objects), sounds (e.g., detecting sounds near the AV 802a), and infrared data (e.g., detecting objects in infrared images). The obstruction detection instructions 246 may include code for detecting objects using other data types as well. In one embodiment, the sensor units 224 are redundant backups for each other. The communication subsystem 210 may include any suitable number of sensor units 224, such as one, two, three, etc.

Vehicle control unit 222 may be implemented in software and/or hardware module, and is generally configured to implement a command 130 received either from the operation server 120 or another AV 802 (e.g., AV 802b) and send the status of the process of implementing the command 130 to the processor 212.

LTE modem 232 may be implemented in software and/or hardware module, and is generally configured to provide Internet connectivity to the communication subsystem 210, for example, through the network 110. The LTE modem 232 is configured to enable wired and/or wireless communications. The LTE modem 232 may be referred to as a first network interface. The LTE modem 232 is further configured to communicate data between the communication subsystem 210 and other devices, systems (e.g., AV 802b), servers (e.g., operation server 120), or domain(s). For example, the LTE modem 232 may comprise a WIFI interface, a local area network (LAN) interface, a wide area network (WAN) interface, a modem, a switch, or a router.

The processor 212 is configured to send and receive data using the LTE modem 232 to other devices, such as the operation server 120. The LTE modem 232 may be configured to use any suitable type of communication protocol. The LTE modem 232 may provide data security to the communication subsystem 210 by providing firewall functionality. For example, the LTE modem 232 may block or filter data communications from unauthorized or unknown sources, and allow data communications from the operation server 120 and other AVs 802. As such, outsiders may not be able to access the AV 802a and its components.

V2V modem 234 may be implemented in software and/or hardware module, and is generally configured to establish communication channels among AVs 802. For example, the AV 802a may transmit commands 130 (or any other data/instruction) to the following AV 802b using the V2V modem 234. The processor 212 is configured to send and receive data using the V2V modem 234 to other devices, such as other AVs 802, e.g. AV 802b. The V2V modem 234 may be referred to as a second network interface.

RF gateway 228 may be implemented in software and/or hardware module, and is generally configured to bridge communications between the vehicle control unit 222 and V2V modem 234. For example, the vehicle control unit 222 may support CAN connections (e.g., using CAN connectors), and the V2V modem 234 may support Ethernet connections (e.g., using Ethernet ports). Thus, the RF gateway 228 may be used to transfer data between the CAN connectors of the vehicle control unit 222 and Ethernet ports of the V2V modem 234.

The RF gateway 228 may comprise a V2V agent 230. The V2V agent 230 may be implemented in software and/or hardware module, and is generally configured to receive commands 130 (or any other data/instruction) from the following AV 802b, via the V2V modem 234.

Memory 242 stores any of the information described with respect to FIGS. 1-10 along with any other data, instructions, logic, rules, or code operable to implement the function(s) described herein when executed by processor 212. For example, the memory 242 may store software instructions 244, obstacle detection instructions 246, sensor data 148, commands 130, and/or any other data/instructions. The software instructions 244 include code that when executed by the processor 212 causes the communication subsystem 210 to perform the functions described herein, such as some or all of those described in FIGS. 1-10. The memory 242 comprises one or more disks, tape drives, or solid-state drives, and may be used as an over-flow data storage device, to store programs when such programs are selected for execution, and to store instructions and data that are read during program execution. The memory 242 may be volatile or non-volatile and may comprise read-only memory (ROM), random-access memory (RAM), ternary content-addressable memory (TCAM), dynamic random-access memory (DRAM), and static random-access memory (SRAM). The memory 242 may include one or more of a local database, cloud database, network-attached storage (NAS), etc.

Computing device 260 is generally any device that is configured to process data and interact with users. Examples of computing device 260 include, but are not limited to, a personal computer, a desktop computer, a workstation, a server, a laptop, a tablet computer, etc. The computing device 260 is configured to execute a software application that is configured to provide a monitoring interface to a user to monitor sensor data 148, commands 130, and/or any other data/instruction. In one embodiment, the computing device 260 may be configured to not allow control of the AV 802 to mitigate unauthorized access and control of the AV 802 through the computing device 260.

Communications Among Components of the Communication Subsystem

In some embodiments, the processor 212 and its components may be configured to connect to other components of the communication subsystem 210 using wired and/or wireless communications. For example, the computing units 214 may be configured to establish communication with other components of the communication subsystem 210 using wired and/or wireless communications.

Each computing unit 214 establishes a separate communication channel with the operation server 120 and/or the following AV 802a, via the network 110. The communication subsystem 210 may periodically (e.g., every 0.02 of a second, every 0.5 of a second, or any other suitable duration) communicate messages or acknowledgments between the computing units 214 and the operation server 120 to detect loss of communication.

Each computing unit 214 connects to the network 110 through the LTE modem 232. Each computing unit 214 may connect to the LTE modem 232 using an Ethernet switch. Each computing unit 214 may be connected to the vehicle control unit 222 using CAN connectors. Each computing unit 214 may be connected to the V2V modem 234 using Ethernet connections.

In the AV 802a, each computing unit 214 and the RF gateway 228 may establish a separate communication channel with a computing device 260 on the AV 802b. The communication subsystem 210 may periodically (e.g., every 0.02 second, every 0.5 second, or any other suitable duration) communicate messages between the RF gateway 228 and the computing device 260 on the AV 802b to detect loss of communication.

Communications Among AVs and the Operation Server

Transitioning to "Connected to the Operation Server and a Following AV" State

Upon igniting or powering on the engine 842a of the AV 802a (see FIG. 8), the components of the communication subsystem 210 are initialized. The components of the processor 212, including the computing units 214 and vehicle control unit 222 establish communication channels to the operation server 120 and/or the following AV 802b. In this manner, the communication subsystem 210 enters a "connected to operation server and a following AV" state. In this state, the operation server 120 (or the remote operator 162 (see FIG. 1) is able to monitor operations of the AV 802a and issue commands 130, similar to that described above in FIG. 1.

Transitioning to "Connected to the Following AV" State

The communication subsystem 210 transitions to the "connected to the following AV" state when the communication channel 270 with the operation server 120 is lost. The loss of communication channel 270 with the operation server 120 is detected based on a periodic acknowledgment message (or lack of the periodic acknowledgment message) between the RF gateway 228 and computing device 260 at the following AV 802b, as described above.

As such, the AV 802a can be tracked, can be sent commands 130 (and receive commands 130 from), its autonomous operations can be monitored even if communication between the AV 802a and the operation server 120 is lost. For example, if the periodic acknowledgment message is not received at its corresponding periodic interval from the operation server 120, the communication subsystem 210 determines that the communication channel 270 with the operation server 120 is lost. In response, the communication subsystem 210 may transition to the "connected to the following AV" state where the AV 802a is connected to the following AV 802b through a second communication channel 280.

Transitioning to "Connected to the Operation Server" State

The communication subsystem 210 transitions to the "connected to the operation server" state when the communication channel 280 with the following AV 802b is lost. The loss of communication channel 280 with the following AV 802b is detected based on a periodic acknowledgment message (or lack of the periodic acknowledgment message) between the computing units 214 and the operation server 120. In this state, the AV 802a can maintain the connection with the operation server 120 as long as the AV 802a can connect to the network 110, e.g., using the LTE modem 232.

As such, the AV 802a can be tracked, can be sent commands 130 (and receive commands 130 from), its autonomous operations can be monitored even if communication between the AV 802a and the following AV 802b is lost. For example, if the periodic acknowledgment message is not received at its corresponding periodic interval from the following AV 802b, the communication subsystem 210 determines that the communication channel 280 with the following AV 802b is lost. In response, the communication subsystem 210 may transition to the "connected to the operation server" state where the AV 802a is connected to the operation server 120 through the communication channel 270.

Transitioning to "Executing a Command without Connections with the Operation Server and Following AV" State The communication subsystem 210 transitions to the "executing a command without connections with the operation server and following AV" state when the communications with the operation server 120 and following AV 802b are lost, i.e., communication channels 270 and 280 are lost. In this state, the processor 212 may execute a command 130 to pull over the AV 802a on a side of a road until the communication subsystem 210 establishes a communication with either or both of the operation server 120 and the following AV 802b. As such, even if communications with both of the operation server 120 and the following AV 802b are lost, the communication subsystem 210 can perform a command 130 to pull over until communication with either or both of the operation server 120 and the following AV 802b is reestablished.

Example Method for Communicating a Command to an AV

FIG. 3 illustrates an example flowchart of a method 300 for communicating a command 130 to an AV 802. Modifications, additions, or omissions may be made to method 300. Method 300 may include more, fewer, or other steps. For example, steps may be performed in parallel or in any suitable order. While at times discussed as the AV 802, operation server 120, control device 850, communication subsystem 210, or components of any of thereof performing steps, any suitable system or components of the system may perform one or more steps of the method 300. For example, one or more steps of method 300 may be implemented, at least in part, in the form of software instructions 138, 244, and 880, respectively, from FIGS. 1, 2, and 8, stored on non-transitory, tangible, machine-readable media (e.g., memories 128, 242, 890, and 1002, respectively, from FIGS. 1, 2, 8, and 10) that when run by one or more processors (e.g., processors 122, 212, 870, 1004, respectively, from FIGS. 1, 2, 8, and 10) may cause the one or more processors to perform steps 302-310.

Method 300 begins at step 302 where the operation server 120 accesses environmental data 150 associated with a road 102 ahead of the AV 802a, where the environmental data 150 comprises weather data 152 and traffic data 154 associated with a time window during which the AV 802a is traveling along the road 102. For example, the operation server 120 may receive the environmental data 150 from one or more external sources, such as live weather reporting news, live traffic reporting news, etc.

At step 304, the operation server 120 compares the environmental data 150 with the map data 142 that comprises expected road conditions ahead of the AV 802. For example, the expected road conditions may comprise predicted weather and traffic congestions ahead of the AV 802a on the road 102.

At step 306, the operation server 120 determines whether the environmental data 150 comprises an unexpected road condition 156 that is not included in the map data 142. The unexpected road conditions 156 may comprise an unexpected weather condition, unexpected traffic congestion, unexpected road closure 104, unexpected object 106, unexpected construction zone 108, among others. For example, based on comparing the environmental data 159 with the map data 142, the operation server 120 may determine whether the environmental data 150 comprises an unexpected road condition 156. The remote operator 162 may confirm, revise, or override the determination of the operation server 120, similar to that described above in FIG. 1. If it is determined that the environmental data 150 comprises an unexpected road condition 156 that is not included in the map data 142, method 300 proceeds to step 308. Otherwise, method 300 terminates.

At step 308, the operation server 120 determines a location coordinate 158 of the unexpected road condition 156. For example, the operation server 120 may determine the location coordinate 158 of the unexpected road condition 156 from the environmental data 150, similar to that described above in FIG. 1.

At step 310, the operation server 120 communicates a command 130 (or an operation server-to-AV command 132) to the AV 802a to maneuver to avoid the unexpected road condition 156. The command 130 may be a broad command 130a or a specific command 130b. Examples of broad command 130a and specific commands 130b are described in FIG. 1.

Example Method for Navigating an AV Based on a Received Command

Figure 4:
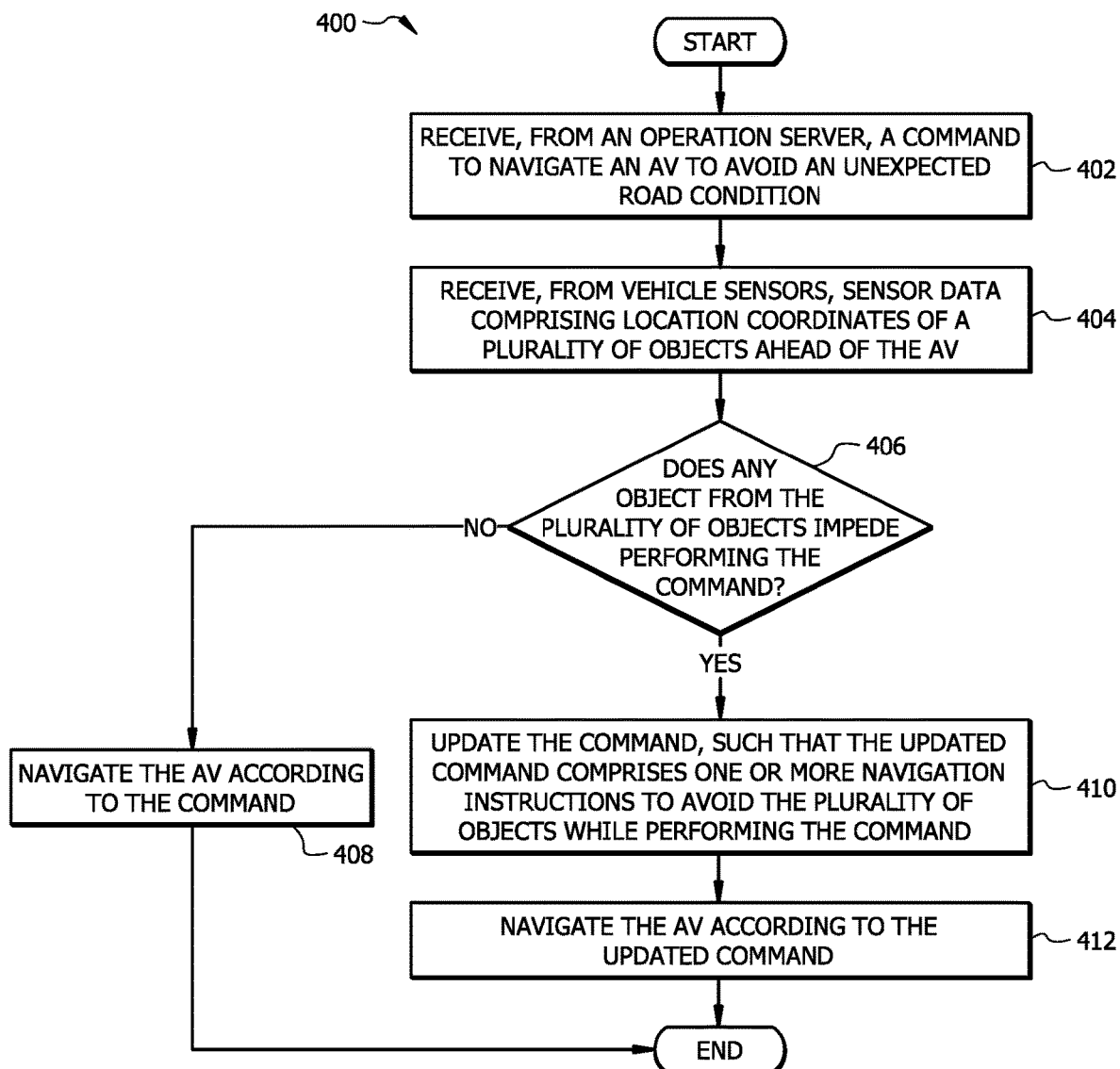
FIG. 4 illustrates an example flowchart of a method for communicating, from an AV, commands to the operation server and/or a following AV.

FIG. 4 illustrates an example flowchart of a method 400 for navigating an AV 802 based on a received command 130. Modifications, additions, or omissions may be made to method 400. Method 400 may include more, fewer, or other steps. For example, steps may be performed in parallel or in any suitable order. While at times discussed as the AV 802, operation server 120, control device 850, communication subsystem 210, or components of any of thereof performing steps, any suitable system or components of the system may perform one or more steps of the method 400. For example, one or more steps of method 400 may be implemented, at least in part, in the form of software instructions 138, 244, and 880, respectively, from FIGS. 1, 2, and 8, stored on non-transitory, tangible, machine-readable media (e.g., memories 128, 242, 890, and 1002, respectively, from FIGS. 1, 2, 8, and 10) that when run by one or more processors (e.g., processors 122, 212, 870, 1004, respectively, from FIGS. 1, 2, 8, and 10) may cause the one or more processors to perform steps 402-412.

Method 400 begins at step 402 where the control device 850 (e.g., via the communication subsystem 210) associated with an AV 802 (e.g., AV 802a of FIG. 1) receives, from the operation server 120, a command 130 to navigate the AV 802 to avoid an unexpected road condition 156, including unexpected road conditions 156 described in FIG. 1.

At step 404, the control device 850 (e.g., via the communication subsystem 210) receives, from vehicle sensors 846, sensor data 148 comprising location coordinates of a plurality of objects ahead of the AV 802. The sensor data 148 may further comprise indications describing the identity of the plurality of objects. For example, the sensor data 148 may indicate the presence of vehicles, pedestrians, obstacles 118, lane markings, road boundaries, road signs, etc., on and around the road 102 of FIG. 1.

At step 406, the control device 850 (e.g., via the communication subsystem 210) determines whether any object from the plurality of objects indicated in the sensor data 148, impedes performing the command 130. For example, the control device 850 (e.g., via the communication subsystem 210) may determine whether an object from the plurality of objects occupies a traveling path of the AV 802a, such that it impedes navigating the AV 802a according to the command 130. If it is determined that an object from the plurality of objects impedes performing the command 130, method 400 proceeds to step 410. Otherwise, method 400 proceeds to step 408.

At step 408, the control device 850 navigates the AV 802a according to the command 130. For example, assuming that the command 130 is to pull over the AV 802a at the location coordinate 114, the control device 850 pulls over the AV 802a at the location coordinate 114, similar to that described in FIG. 1.

At step 410, the control device 850 (e.g., via the communication subsystem 210) updates the command 130, such that the updated command 130-1 comprises one or more navigation instructions to avoid the plurality of objects while performing the command 130. For example, assuming that the command 130 is to pull over the AV 802a at the location coordinate 114, if the control device 850 determines that the spot with the location coordinate 114 is occupied by an obstacle or object, the control device 850 (e.g., via the communication subsystem 210) updates the command 130 to pull over the AV 802a at the location coordinate 116, similar to that described in FIG. 1.

At step 412, the control device 850 navigates the AV 802a according to the updated command 130-1.

First Example System for Communicating Commands Among Two or More AVs

Figure 5:
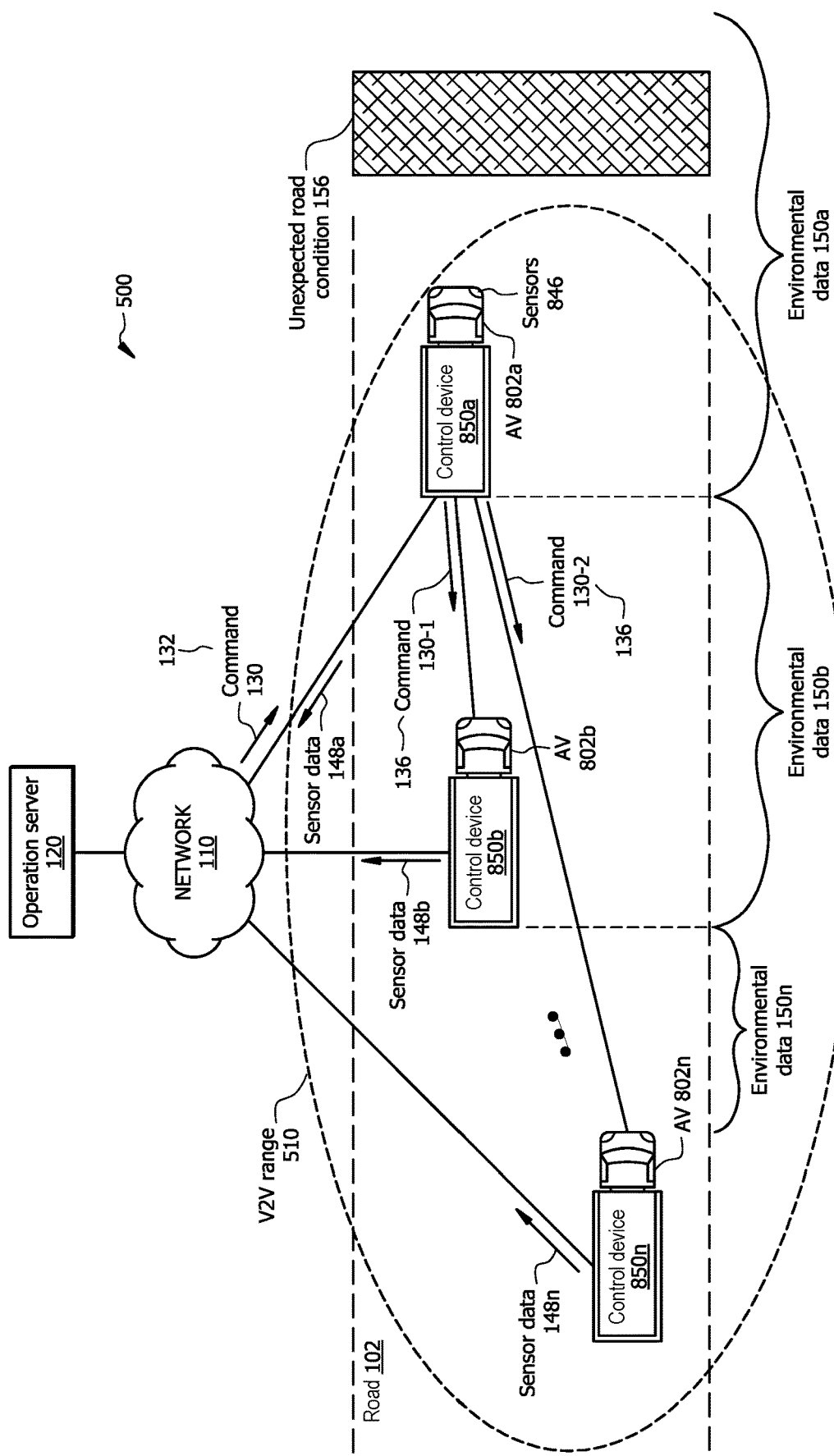
FIG. 5 illustrates a first example embodiment of a system configured to communicate commands among AVs.

FIG. 5 illustrates an embodiment of a system 500 for communicating commands 130 among two or more AVs 802. FIG. 5 further illustrates a simplified schematic diagram of the road 102 traveled by the AVs 802 including, the lead AV 802a, the first following AV 802b, and the second following AV 802n. In FIG. 5, the AVs 802 are heading toward an unexpected road condition 156, similar to that described in FIG. 1. In one embodiment, system 500 comprises the operation server 120, the lead AV 802a, and the first following AV 802b. In some embodiments, system 500 further comprises the second following AV 802n and the network 110. Network 110 enables communications among components of system 500. The system 500 may be configured as shown or in any other suitable configurations.

As illustrated in FIG. 5, the lead AV 802a, following AV 802b, and following AV 802n are in a V2V communication range 510. Although, three AVs 802 are illustrated in FIG. 5, in light of this disclosure one of ordinary skill in the art would appreciate that any number of AVs 802 can be in the V2V communication range 510. The V2V communication range 510 may correspond to a threshold distance range of the operation of the V2V modem 234 implemented in the communication subsystem 210 described in FIG. 2. As such, using the V2V modems 234 (see FIG. 2), the AVs 802 can communicate data, including commands 130, with one another. The corresponding description below describes communicating commands 130 among the AVs 802 in the V2V communication range 510.

Communicating a Command to a First Following AV

In general, system 500 (at the lead AV 802a) receives a command 130 (e.g., an operation server-to-AV command 132) to navigate the lead AV 802a to avoid an unexpected road condition 156 ahead of the lead AV 802a. For example, the lead AV 802a may receive the command 130, in response to the operation server 120 detecting the unexpected road condition 156 in the environmental data 150a associated with a portion of the road 102 ahead of the lead AV 802a, similar to that described in FIG. 1.

The control device 850a, associated with the lead AV 802a, receives sensor data 148a from the sensors 846, where the sensor data 148a comprises location coordinates of a first plurality of objects ahead of the lead AV 802a. For example, the sensor data 148a may include location coordinates of other vehicles, road signs, lane markings, road boundaries, traffic lights, among any other object that the sensors 846 may detect. The control device 850a may be an instance of control device 850 described in FIG. 8. The control device 850a may send and receive commands 130 via the communication subsystem 210 described in FIG. 2. The control device 850a (e.g., via the communication subsystem 210 (see FIG. 2)) may or may not update the command 130 for navigating the lead AV 802a, based on analyzing the sensor data 148a, similar to that described in FIGS. 1 and 2. The control device 850a may determine and communicate a command 130-1 (e.g., an AV-to-AV command 136) to the following AV 802b, as described below.

The control device 850a accesses environmental data 150b associated with a portion of the road 102 between the lead AV 802a and the following AV 802b. Since the lead AV 802a has traveled the portion of road 102 between the lead AV 802a and the following AV 802b, the lead AV 802a has experienced and recorded the environmental data 150b. The environmental data 150b may comprise location coordinates of a second plurality of objects between the lead AV 802a and the following AV 802b. The environmental data 150b may further comprise road safety regulation data, data related to obstacles 118 (see FIG. 1), among any other data that the lead AV 802a has experienced and recorded while traveling the portion of road 102 between the lead AV 802a and the following AV 802b. The environmental data 150b is associated with a time window during which the following AV 802b is traveling along the road 102.

The control device 850a determines whether at least one object detected in any of the sensor data 148a and environmental data 150a and 150b impedes performing the command 130 by the following AV 802b. For example, the control device 850a may receive the trajectory of the following AV 802b (e.g., from the operation server 120 and/or the following AV 802b), and determine whether any object detected in any of the sensor data 148a and environmental data 150a and 150b is on a traveling pathway of the following AV 802b. In another example, the control device 850a may determine the trajectory of the following AV 802b using sensors 846, similar to that described in FIG. 8. The control device 850a may determine that an object impedes performing the command 130 by the following AV 802b, if the object is on the traveling pathway of the following AV 802b.

In response to determining that at least one object (detected in any of the sensor data 148a and environmental data 150a and 150b) impedes performing the command 130 by the following AV 802b, the control device 850a updates the command 130 for the following AV 802b. In this process, the control device 850a generates the updated command 130-1 (e.g., an AV-to-AV command 136). The updated command 130-1 comprises one or more navigation instructions for the following AV 802b to avoid at least one object detected on the traveling pathway of the following AV 802b while performing the command 130. The control device 850a communicates the updated command 130-1 to the following AV 802b.

The control device 850b, associated with the following AV 802b, receives the updated command 130-1, and navigates the AV 802b according to the updated command 130-1. The control device 850b may be an instance of the control device 850 described in FIG. 8.

In one embodiment, the control device 850b may further update the command 130-1, in response to determining that an object detected in the sensor data 148b impedes performing the command 130-1, similar to that described above in FIGS. 1 and 2.

Communicating a Command to a Second Following AV

Similar to that described above, the control device 850a may generate the updated command 130-2, and communicate the updated command 130-2 to the second following AV 802n that is in the V2V communication range 510 of the lead AV 802a. In this process, the control device 850a accesses the environmental data 150 associated with a portion of the road 102 between the lead AV 802a and the second following AV 802n. The environmental data 150 associated with a portion of the road 102 between the lead AV 802a and the second following AV 802n may include the aggregate of environmental data 150b and 150n. The aggregate of environmental data 150b and 150n may include location coordinates of a plurality of objects between the lead AV 802a and the second following AV 802n. The aggregate of environmental data 150b and 150n may further comprise road safety regulation data, data related to obstacles 118 (see FIG. 1), among any other data that the lead AV 802a has experienced and recorded while traveling the portion of the road 102 between the lead AV 802a and the second following AV 802n. The aggregate of environmental data 150b and 150n is associated with a time window during which the second following AV 802n is traveling along the road 102.

The control device 850a determines whether at least one object detected in any of the sensor data 148a and environmental data 150a, 150b, and 150n impedes performing the command 130 by the second following AV 802n. For example, the control device 850a may receive the trajectory of the second following AV 802n (e.g., from the operation server 120 and/or the following AV 802n), and determine whether an object detected in any of the sensor data 148a and environmental data 150a, 150b, and 150n is on a traveling pathway of the second following AV 802n.

In response to determining that at least one object (detected in any of the sensor data 148a and environmental data 150a, 150b, and 150n) impedes performing the command 130 by the second following AV 802n, the control device 850a updates the command 130 for the second following AV 802n. In this process, the control device 850a generates the second updated command 130-2 by updating the command 130-1. The second updated command 130-2 comprises one or more navigation instructions for the second following AV 802n to avoid the at least one object detected on the traveling pathway of the second following AV 802n while performing the command 130-1. The control device 850a communicates the second updated command 130-2 (e.g., an AV-to-AV command 136) to the second following AV 802n, so that the AV 802n can be navigated according to the command 130-2 to avoid the unexpected road condition 156 and objects on its traveling pathway.

In this manner, the lead AV 802a may update and communicate a command 130 to an n-th following AV 802, according to the sensor data 148a, environmental data 150a, and the aggregate of corresponding environmental data 150 between the lead AV 802a and the n-th following AV 802.

In one embodiment, any of the AVs 802 (e.g., AVs 802a-n) may further update or revise a received command 130 (or updated command 130-1, 130-2) based on analyzing their corresponding sensor data 148, similar to that described in FIGS. 1 and 2.

In one embodiment, any of the AVs 802 (e.g., AVs 802a-n) may send a received command 130 (or updated command 130-1, 130-2) to the operation server 120 and request further instructions, similar to that described in FIGS. 1 and 2.

In one embodiment, any of the AVs 802 (e.g., AVs 802a-n) may send a received command 130 (or updated commands 130-1, 130-2) to the operation server 120 to request for confirmation, similar to that described in FIGS. 1 and 2.

In one embodiment, the AV 802b may be the lead AV 802 in V2V communication range 510 with one or more AVs 802 traveling behind the AV 802b.

As further illustrated in FIG. 5, while the AVs 802 (e.g., AVs 802a-n) are traveling along the road 102, the AVs 802 communicate their corresponding sensor data 148 to the operation server 120. For example, the lead AV 802a communicates sensor data 148a, the following AV 802b communicates sensor data 148b, and the second following AV 802n communicates sensor data 148n to the operation server 120, similar to that described in FIGS. 1 and 2. The operation server 120 may use the sensor data 148a-n, to confirm, revise, or override the determination of any of the control devices 850a-n with respect to commands 130, 130-1, and 130-2 or any navigation solution, similar to that described in FIGS. 1 and 2.

Second Example System for Communicating Commands Among Two or More AVs

Figure 6:
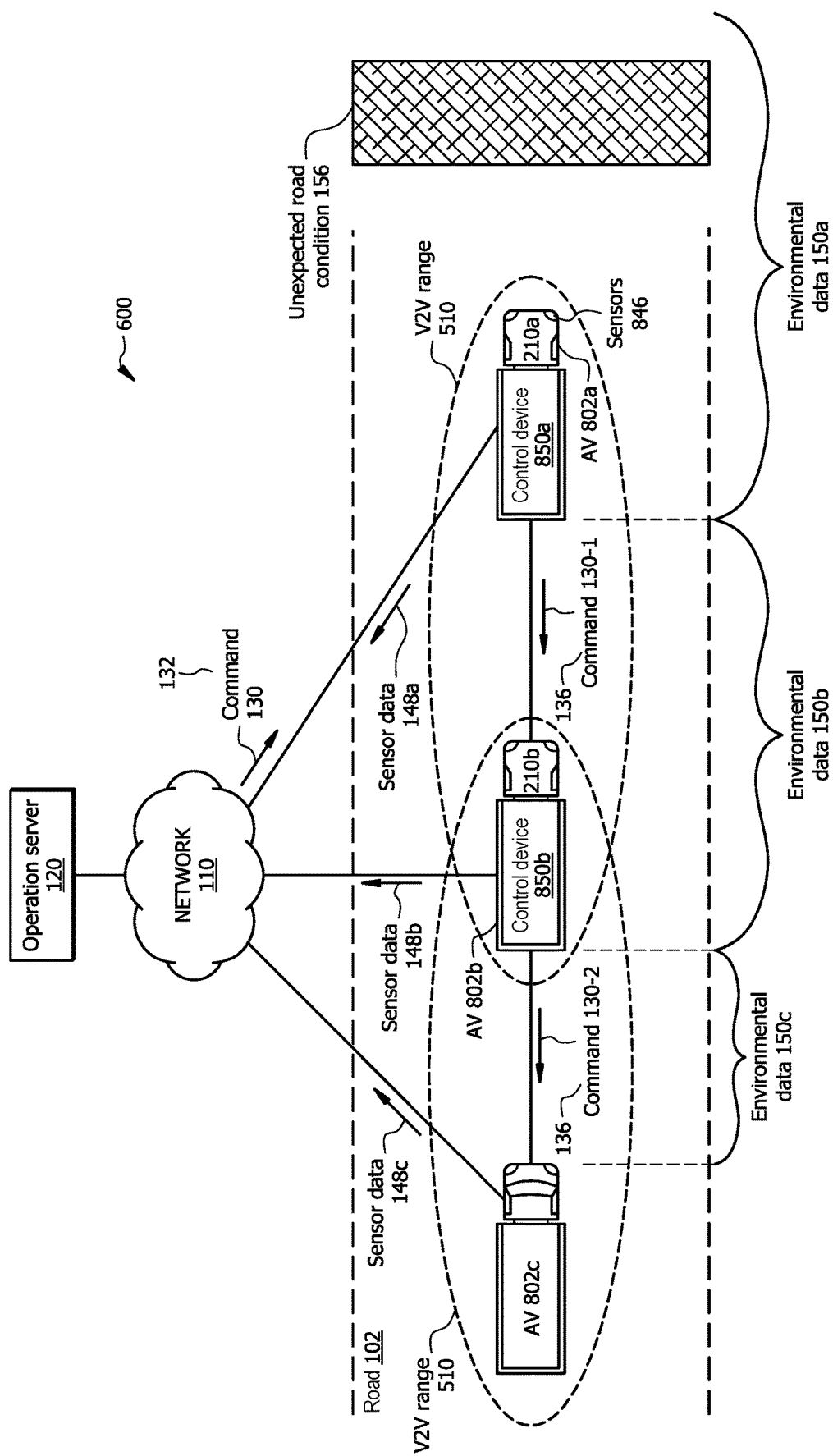
FIG. 6 illustrates a second example embodiment of a system configured to communicate commands among AVs.

FIG. 6 illustrates an embodiment of a system 600 for communicating commands 130 among two or more AVs 802. FIG. 6 further illustrates a simplified schematic of the road 102 traveled by the AVs 802, including the lead AV 802a, the first following AV 802b, and the second following AV 802c. In FIG. 6, the AVs 802 are heading toward an unexpected road condition 156, similar to that described in FIG. 1. In one embodiment, system 600 comprises the operation server 120, the lead AV 802a, and the first following AV 802b. In some embodiments, system 600 further comprises the second following AV 802c and the network 110. Network 110 enables communications among components of system 600. The system 600 may be configured as shown or in any other suitable configurations.

As illustrated in FIG. 6, the lead AV 802a and the first following AV 802b are in a first V2V communication range 510 from each other, and the first following AV 802b and the second following AV 802c are in a second V2V communication range 510 from each other. The AVs 802 that are in a V2V communication range 510 can communicate data, including commands 130, with each other. FIG. 6 illustrates a scenario in which various sets of AVs 802 are in different V2V communication ranges 510. The corresponding description below described communicating commands 130 among AVs 802 in different V2V communication ranges 510.

Communicating a Command to a First Following AV

The process of the lead AV 802a communicating the updated command 130-1 (e.g., an AV-to-AV command 136) to the following AV 802b may be similar to that described in FIG. 5. In this process, the lead AV 802a receives a command 130 to avoid an unexpected road condition 156 ahead of the lead AV 802a, where the command 130 is issued in response to detecting the unexpected road condition 156 in the environmental data 150a. The control device 850a, associated with the lead AV 802a, receives sensor data 148a from the sensors 846, where the sensor data 148a comprises location coordinates of a first plurality of objects ahead of the lead AV 802a. The control device 850a accesses environmental data 150b associated with a portion of the road 102 between the lead AV 802a and the following AV 802b. The control device 850a determines whether at least one object detected in any of the sensor data 148a and environmental data 150a and 150b impedes performing the command 130 by the following AV 802b. In response to determining that at least one object (detected in any of the sensor data 148a and environmental data 150a and 150b) impedes performing the command 130 by the following AV 802b, the control device 850a generates the updated command 130-1 by updating the command 130, such that the updated command 130-1 comprises one or more navigation instructions for the following AV 802b to avoid the at least one object detected on the traveling pathway of the following AV 802b while performing the command 130. The control device 850a communicates the updated command 130-1 to the following AV 802b. Upon receiving the updated command 130-1, the control device 850b may navigate the AV 802b according to the updated command 130-1.

In scenarios where a particular AV 802 is not in the V2V communication range 510 of the lead AV 802a, the particular AV 802 may receive a command 130 to avoid the unexpected road condition 156 from the operation server 120 (similar to that described in FIGS. 1 and 2) and/or from another AV 802 that is in the V2V communication range 510 from the particular AV 802, as described below. In FIG. 6, the second following AV 802c is not in the V2V communication range 510 of the lead AV 802a, however, the second following AV 802c is in the V2V communication range 510 of the first following AV 802b. Thus, the second following AV 802c may receive a command 130-2 to avoid the unexpected road condition 156 from the first following AV 802b. This process is described below.

Communicating a Command to a Second Following AV

To generate the command 130-2 (e.g., an AV-to-AV command 136) for the second following AV 802c, the control device 850b may access the environmental data 150c associated with a portion of the road 102 between the AV 802b and the AV 802c. The environmental data 150c may comprise location coordinates of a plurality of objects between the AV 802b and the AV 802c. The environmental data 150c may further comprise road safety regulation data, data related to obstacles 118 (see FIG. 1), among any other data that the AV 802b has experienced and recorded while traveling the portion of the road 102 between the AV 802b and the AV 802c. The environmental data 150c is associated with a time window during which the second following AV 802c is traveling along the road 102. The control device 850b may further access and analyze sensor data 148b, similar to that described in FIG. 5 with respect to control device 850a.

The control device 850b determines whether at least one object detected in any of the sensor data 148b and environmental data 150a, 150b, and 150c impedes performing the command 130-1 by the AV 802c. For example, the control device 850b may receive the trajectory of the AV 802c (e.g., from the operation server 120 and/or the AV 802c), and determine whether an object detected in any of the sensor data 148b and environmental data 150a, 150b, and 150c is on the traveling pathway of the AV 802c. In response to determining that at least one object (detected in any of the sensor data 148b and environmental data 150a, 150b, and 150c) impedes performing the command 130-1 by the AV 802c, the control device 850b generates the command 130-2 by updating the command 130-1, such that the command 130-2 comprises one or more navigation instructions for the AV 802c to avoid at least one object detected on the traveling pathway of the AV 802c while performing the command 130-1. The control device 850b communicates the command 130-2 to the AV 802c, so that the AV 802c can be navigated according to the command 130-2 to avoid the unexpected road condition 156 and objects on its traveling pathway.

In one embodiment, any of the AVs 802 (e.g., AVs 802a-c) may further update or revise a received command 130 (or updated command 130-1, 130-2) based on analyzing their corresponding sensor data 148, similar to that described in FIGS. 1 and 2.

In one embodiment, any of the AVs 802 (e.g., AVs 802a-c) may send a received command 130 (or updated command 130-1, 130-2) to the operation server 120 and request further instructions, similar to that described in FIGS. 1 and 2.

In one embodiment, any of the AVs 802 (e.g., AVs 802a-c) may send a received command 130 (or updated command 130-1, 130-2) to the operation server 120 to request for confirmation, similar to that described in FIGS. 1 and 2.

As further illustrated in FIG. 6, while the AVs 802 (e.g., AVs 802a-c) are traveling along the road 102, the AVs 802 communicate their corresponding sensor data 148 to the operation server 120. For example, the lead AV 802a communicates sensor data 148a, the following AV 802b communicates sensor data 148b, and the second following AV 802c communicates sensor data 148c to the operation server 120, similar to that described in FIGS. 1 and 2. The operation server 120 may use the sensor data 148a-c, to confirm, revise, or override the determination of any of the control devices 850a-c with respect to commands 130, 130-1, and 130-2 or any navigation solution, similar to that described in FIGS. 1 and 2.

Although, three AVs 802 are illustrated in FIG. 6, this disclosure contemplates any number of AVs 802 on a road 102 communicating commands 130 (or updated commands 130-1, 130-2, etc.) to one or more other AVs 802. As such, this disclosure contemplates one-to-one, one-to-many, and many-to-many communications among the network mesh of AVs 802 and the operation server 120.

Example Method for Communicating Commands Among AVs

Figure 7:
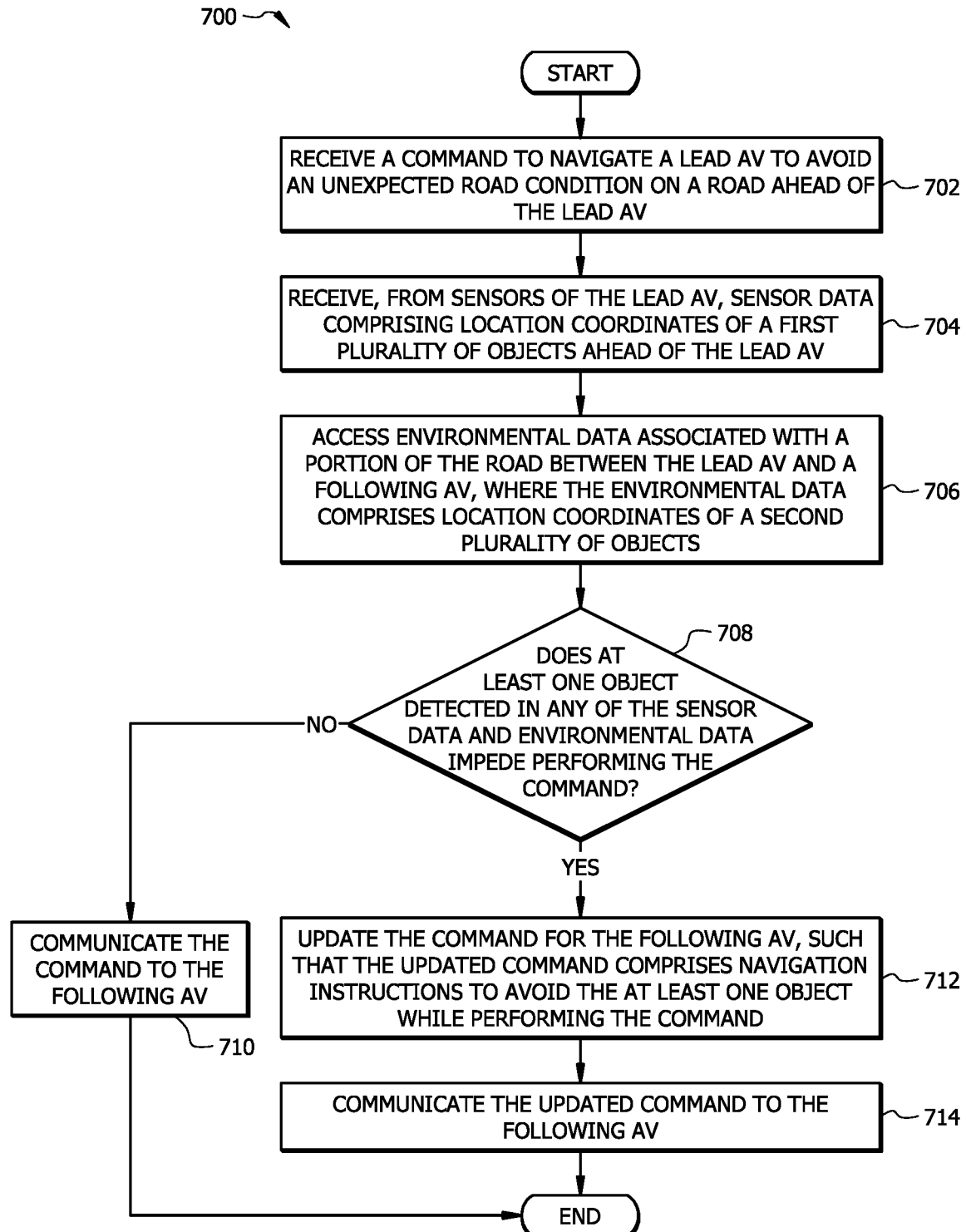
FIG. 7 illustrates an example flowchart of a method for communicating commands among AVs.

FIG. 7 illustrates an example flowchart of a method 700 for communicating commands 130 among AVs 802. Modifications, additions, or omissions may be made to method 700. Method 700 may include more, fewer, or other steps. For example, steps may be performed in parallel or in any suitable order. While at times discussed as the AV 802, operation server 120, control devices 850, communication subsystems 210, or components of any of thereof performing steps, any suitable system or components of the system may perform one or more steps of the method 700. For example, one or more steps of method 700 may be implemented, at least in part, in the form of software instructions 138, 244, and 880, respectively, from FIGS. 1, 2, and 8, stored on non-transitory, tangible, machine-readable media (e.g., memories 128, 242, 890, and 1002, respectively, from FIGS. 1, 2, 8, and 10) that when run by one or more processors (e.g., processors 122, 212, 870, 1004, respectively, from FIGS. 1, 2, 8, and 10) may cause the one or more processors to perform steps 702-714.

Method 700 begins at step 702 where a control device 850a, associated with a lead AV 802a, receives a command 130 to navigate the lead AV 802a to avoid an unexpected road condition 156. The control device 850a may receive the command 130 via the communication subsystem 210 described in FIG. 2. For example, the control device 850a may receive the command 130 from the operation server 120, in response to the operation server 120 detecting the unexpected road condition 156 in the environmental data 150a associated with a portion of the road 102 ahead of the lead AV 802a, similar to that described in FIGS. 1, 5, and 6.

At step 704, the control device 850a receives, from sensors 846 associated with the lead AV 802a, sensor data 148a, where the sensor data 148a comprises location coordinates of a first plurality of objects ahead of the lead AV 802a. For example, the control device 850a may be triggered to receive the sensor data 148a from the sensors 846, in response to receiving the command 130. In another example, the control device 850a may receive the sensor data 148a periodically (e.g., every 0.02 of a second, every 0.5 of a second, or any other suitable duration), similar to that described in FIG. 2.

At step 706, the control device 850a accesses environmental data 150b associated with a portion of the road 102 between the lead AV 802a and a following AV 802b. Since the lead AV 802a has traveled the portion of the road 102 between the lead AV 802a and the following AV 802b, the lead AV 802a has experienced and recorded the environmental data 150b. The environmental data 150b may comprise location coordinates of a second plurality of objects between the lead AV 802a and the following AV 802b. The environmental data 150b may further comprise road safety regulation data, data related to obstacles 118 (see FIG. 1), among any other data that the lead AV 802a has experienced and recorded while traveling the portion of the road 102 between the lead AV 802a and the following AV 802b. The environmental data 150a is associated with a time window during which the following AV 802b is traveling along the road 102.

At step 708, the control device 850a determines whether at least one object detected in any of the sensor data 148a and the environmental data 150a and 150b impedes performing the command 130 by the following AV 802b. For example, the control device 850a may receive the trajectory of the following AV 802b (e.g., from the operation server 120 and/or the following AV 802b), and determine whether any object detected in any of the sensor data 148a and environmental data 150a and 150b is on a traveling pathway of the following AV 802b. If the control device 850a determines that at least one object detected in any of the sensor data 148a and environmental data 150a and 150b impedes performing the command 130 by the following AV 802b, method 700 proceeds to step 712. Otherwise, method 700 proceeds to step 710.

At step 710, the control device 850a communicates the command 130 to the following AV 802b. For example, the control device 850a communicates the original command 130 to the following AV 802b via the communication subsystem 210.

At step 712, the control device 850a updates the command 130 for the following AV 802b, such that the updated command 130-1 comprises one or more instructions to avoid the at least one object while performing the command 130.

At step 714, the control device 850a communicates the updated command 130-1 to the following AV 802b.

In one embodiment, the lead AV 802a may further update and communicate commands 130 (or updated commands 130-1, 130-2) to any particular AV 802 that is in the V2V communication range 510 of the lead AV 802a according to the sensor data 148a, environmental data 150a, and the aggregate of the environmental data 150 associated with a portion of the road 102 between the lead AV 802 and the particular AV 802, similar to that described in FIG. 5.

In cases where a particular AV 802 is not in the V2V communication range 510 of the lead AV 802, the particular AV 802 may receive commands 130 (or updated commands 130-1, 130-2) from another AV 802 (e.g., indirectly from the lead AV 802a) in the V2V communication range 510 of the particular AV 802, similar to that described in FIG. 6. For example, multiple AVs 802 on the road 102 may form a network mesh of AVs 802 in which any AV 802 may send and receive commands 130 (or updated commands 130-1, 130-2) or any other data/instruction to and from any other AV 802.

Example AV and its Operation

FIG. 8 shows a block diagram of an example vehicle ecosystem 800 in which autonomous driving operations can be determined. As shown in FIG. 8, the AV 802 may be a semi-trailer truck. The vehicle ecosystem 800 includes several systems and components that can generate and/or deliver one or more sources of information/data and related services to the in-vehicle control computer 850 that may be located in an AV 802. The in-vehicle control computer 850 can be in data communication with a plurality of vehicle subsystems 840, all of which can be resident in the AV 802. A vehicle subsystem interface 860 is provided to facilitate data communication between the in-vehicle control computer 850 and the plurality of vehicle subsystems 840. In some embodiments, the vehicle subsystem interface 860 can include a controller area network (CAN) controller to communicate with devices in the vehicle subsystems 840.

The AV 802 may include various vehicle subsystems that support of the operation of AV 802. The vehicle subsystems 840 may include communication subsystem 210, a vehicle drive subsystem 842, a vehicle sensor subsystem 844, and/or a vehicle control subsystem 848. The components or devices of the vehicle drive subsystem 842, the vehicle sensor subsystem 844, and the vehicle control subsystem 848 shown in FIG. 8 are examples. The AV 802 may be configured as shown or any other configurations.

The vehicle drive subsystem 842 may include components operable to provide powered motion for the AV 802. In an example embodiment, the vehicle drive subsystem 842 may include an engine/motor 842a, wheels/tires 842b, a transmission 842c, an electrical subsystem 842d, and a power source 842e.

The vehicle sensor subsystem 844 may include a number of sensors 846 configured to sense information about an environment or condition of the AV 802. The vehicle sensor subsystem 844 may include one or more cameras 846a or image capture devices, a Radar unit 846b, one or more temperature sensors 846c, a wireless communication unit 846d (e.g., a cellular communication transceiver), an inertial measurement unit (IMU) 846e, a laser range finder/LiDAR unit 846f, a Global Positioning System (GPS) transceiver 846g, and/or a wiper control system 846h. The vehicle sensor subsystem 844 may also include sensors configured to monitor internal systems of the AV 802 (e.g., an $O_2$ monitor, a fuel gauge, an engine oil temperature, etc.).

The IMU 846e may include any combination of sensors (e.g., accelerometers and gyroscopes) configured to sense position and orientation changes of the AV 802 based on inertial acceleration. The GPS transceiver 846g may be any sensor configured to estimate a geographic location of the AV 802. For this purpose, the GPS transceiver 846g may include a receiver/transmitter operable to provide information regarding the position of the AV 802 with respect to the Earth. The Radar unit 846b may represent a system that utilizes radio signals to sense objects within the local environment of the AV 802. In some embodiments, in addition to sensing the objects, the Radar unit 846b may additionally be configured to sense the speed and the heading of the objects proximate to the AV 802. The laser range finder or LiDAR unit 846f may be any sensor configured to sense objects in the environment in which the AV 802 is located using lasers. The cameras 846a may include one or more devices configured to capture a plurality of images of the environment of the AV 802. The cameras 846a may be still image cameras or motion video cameras.

The vehicle control subsystem 848 may be configured to control the operation of the AV 802 and its components. Accordingly, the vehicle control subsystem 848 may include various elements such as a throttle and gear selector 848a, a brake unit 848b, a navigation unit 848c, a steering system 848d, and/or an autonomous control unit 848e. The throttle 848a may be configured to control, for instance, the operating speed of the engine and, in turn, control the speed of the AV 802. The gear selector 848a may be configured to control the gear selection of the transmission. The brake unit 848b can include any combination of mechanisms configured to decelerate the AV 802. The brake unit 848b can slow the AV in a standard manner, including by using friction to slow the wheels or engine braking. The brake unit 848b may include an anti-lock brake system (ABS) that can prevent the brakes from locking up when the brakes are applied. The navigation unit 848c may be any system configured to determine a driving path or route for the AV 802. The navigation 848c unit may additionally be configured to update the driving path dynamically while the AV 802 is in operation. In some embodiments, the navigation unit 848c may be configured to incorporate data from the GPS transceiver 846g and one or more predetermined maps so as to determine the driving path (e.g., along the road 102 of FIG. 1) for the AV 802. The steering system 848d may represent any combination of mechanisms that may be operable to adjust the heading of AV 802 in an autonomous mode or in a driver-controlled mode.

The autonomous control unit 848e may represent a control system configured to identify, evaluate, and avoid or otherwise negotiate potential obstacles or obstructions in the environment of the AV 802. In general, the autonomous control unit 848e may be configured to control the AV 802 for operation without a driver or to provide driver assistance in controlling the AV 802. In some embodiments, the autonomous control unit 848e may be configured to incorporate data from the GPS transceiver 846g, the Radar 846b, the LiDAR unit 846f, the cameras 846a, and/or other vehicle subsystems to determine the driving path or trajectory for the AV 802.

Many or all of the functions of the AV 802 can be controlled by the in-vehicle control computer 850. The in-vehicle control computer 850 may include at least one data processor 870 (which can include at least one microprocessor) that executes processing instructions 880 stored in a non-transitory computer readable medium, such as the data storage device 890 or memory. The in-vehicle control computer 850 may also represent a plurality of computing devices that may serve to control individual components or subsystems of the AV 802 in a distributed fashion. In some embodiments, the data storage device 890 may contain processing instructions 880 (e.g., program logic) executable by the data processor 870 to perform various methods and/or functions of the AV 802, including those described with respect to FIGS. 1-7.

The data storage device 890 may contain additional instructions as well, including instructions to transmit data to, receive data from, interact with, or control one or more of the vehicle drive subsystem 842, the vehicle sensor subsystem 844, and the vehicle control subsystem 848. The in-vehicle control computer 850 can be configured to include a data processor 870 and a data storage device 890. The in-vehicle control computer 850 may control the function of the AV 802 based on inputs received from various vehicle subsystems (e.g., the vehicle drive subsystem 842, the vehicle sensor subsystem 844, and the vehicle control subsystem 848).

FIG. 9 shows an exemplary system 900 for providing precise autonomous driving operations. The system 900 includes several modules that can operate in the in-vehicle control computer 850, as described in FIG. 8. The in-vehicle control computer 850 includes a sensor fusion module 902 shown in the top left corner of FIG. 9, where the sensor fusion module 902 may perform at least four image or signal processing operations. The sensor fusion module 902 can obtain images from cameras located on an autonomous vehicle to perform image segmentation 904 to detect the presence of moving objects (e.g., other vehicles, pedestrians, etc.) and/or static obstacles (e.g., stop sign, speed bump, terrain, etc.) located around the autonomous vehicle. The sensor fusion module 902 can obtain LiDAR point cloud data item from LiDAR sensors located on the autonomous vehicle to perform LiDAR segmentation 906 to detect the presence of objects and/or obstacles located around the autonomous vehicle.

The sensor fusion module 902 can perform instance segmentation 908 on image and/or point cloud data item to identify an outline (e.g., boxes) around the objects and/or obstacles located around the autonomous vehicle. The sensor fusion module 902 can perform temporal fusion 910 where objects and/or obstacles from one image and/or one frame of point cloud data item are correlated with or associated with objects and/or obstacles from one or more images or frames subsequently received in time.

The sensor fusion module 902 can fuse the objects and/or obstacles from the images obtained from the camera and/or point cloud data item obtained from the LiDAR sensors. For example, the sensor fusion module 902 may determine based on a location of two cameras that an image from one of the cameras comprising one half of a vehicle located in front of the autonomous vehicle is the same as the vehicle located captured by another camera. The sensor fusion module 902 sends the fused object information to the interference module 946 and the fused obstacle information to the occupancy grid module 960. The in-vehicle control computer includes the occupancy grid module 960 which can retrieve landmarks from a map database 958 stored in the in-vehicle control computer. The occupancy grid module 960 can determine drivable areas and/or obstacles from the fused obstacles obtained from the sensor fusion module 902 and the landmarks stored in the map database 958. For example, the occupancy grid module 960 can determine that a drivable area may include a speed bump obstacle.

Below the sensor fusion module 902, the in-vehicle control computer 850 includes a LiDAR based object detection module 912 that can perform object detection 916 based on point cloud data item obtained from the LiDAR sensors 914 located on the autonomous vehicle. The object detection 916 technique can provide a location (e.g., in 3D world coordinates) of objects from the point cloud data item. Below the LiDAR based object detection module 912, the in-vehicle control computer includes an image-based object detection module 918 that can perform object detection 924 based on images obtained from cameras 920 located on the autonomous vehicle. The object detection 918 technique can employ a deep machine learning technique 924 to provide a location (e.g., in 3D world coordinates) of objects from the image provided by the camera 920.

The Radar 956 on the autonomous vehicle can scan an area in front of the autonomous vehicle or an area towards which the autonomous vehicle is driven. The Radar data is sent to the sensor fusion module 902 that can use the Radar data to correlate the objects and/or obstacles detected by the Radar 956 with the objects and/or obstacles detected from both the LiDAR point cloud data item and the camera image. The Radar data is also sent to the interference module 946 that can perform data processing on the Radar data to track objects by object tracking module 948 as further described below.

The in-vehicle control computer includes an interference module 946 that receives the locations of the objects from the point cloud and the objects from the image, and the fused objects from the sensor fusion module 902. The interference module 946 also receives the Radar data with which the interference module 946 can track objects by object tracking module 948 from one point cloud data item and one image obtained at one time instance to another (or the next) point cloud data item and another image obtained at another subsequent time instance.

The interference module 946 may perform object attribute estimation 950 to estimate one or more attributes of an object detected in an image or point cloud data item. The one or more attributes of the object may include a type of object (e.g., pedestrian, car, or truck, etc.). The interference module 946 may perform behavior prediction 952 to estimate or predict motion pattern of an object detected in an image and/or a point cloud. The behavior prediction 952 can be performed to detect a location of an object in a set of images received at different points in time (e.g., sequential images) or in a set of point cloud data item received at different points in time (e.g., sequential point cloud data items). In some embodiments the behavior prediction 952 can be performed for each image received from a camera and/or each point cloud data item received from the LiDAR sensor. In some embodiments, the interference module 946 can be performed (e.g., run or executed) to reduce computational load by performing behavior prediction 952 on every other or after every pre-determined number of images received from a camera or point cloud data item received from the LiDAR sensor (e.g., after every two images or after every three point cloud data items).

The behavior prediction 952 feature may determine the speed and direction of the objects that surround the autonomous vehicle from the Radar data, where the speed and direction information can be used to predict or determine motion patterns of objects. A motion pattern may comprise a predicted trajectory information of an object over a pre-determined length of time in the future after an image is received from a camera. Based on the motion pattern predicted, the interference module 946 may assign motion pattern situational tags to the objects (e.g., "located at coordinates (x,y)," "stopped," "driving at 50 mph," "speeding up" or "slowing down"). The situation tags can describe the motion pattern of the object. The interference module 946 sends the one or more object attributes (e.g., types of the objects) and motion pattern situational tags to the planning module 962. The interference module 946 may perform an environment analysis 954 using any information acquired by system 900 and any number and combination of its components.

The in-vehicle control computer includes the planning module 962 that receives the object attributes and motion pattern situational tags from the interference module 946, the drivable area and/or obstacles, and the vehicle location and pose information from the fused localization module 926 (further described below).

The planning module 962 can perform navigation planning 964 to determine a set of trajectories on which the autonomous vehicle can be driven. The set of trajectories can be determined based on the drivable area information, the one or more object attributes of objects, the motion pattern situational tags of the objects, location of the obstacles, and the drivable area information. In some embodiments, the navigation planning 964 may include determining an area next to the road where the autonomous vehicle can be safely parked in case of emergencies. The planning module 962 may include behavioral decision making 966 to determine driving actions (e.g., steering, braking, throttle) in response to determining changing conditions on the road (e.g., traffic light turned yellow, or the autonomous vehicle is in an unsafe driving condition because another vehicle drove in front of the autonomous vehicle and in a region within a pre-determined safe distance of the location of the autonomous vehicle). The planning module 962 performs trajectory generation 968 and selects a trajectory from the set of trajectories determined by the navigation planning operation 964. The selected trajectory information is sent by the planning module 962 to the control module 970.

The in-vehicle control computer includes a control module 970 that receives the proposed trajectory from the planning module 962 and the autonomous vehicle location and pose from the fused localization module 926. The control module 970 includes a system identifier 972. The control module 970 can perform a model based trajectory refinement 974 to refine the proposed trajectory. For example, the control module 970 can applying a filtering (e.g., Kalman filter) to make the proposed trajectory data smooth and/or to minimize noise. The control module 970 may perform the robust control 976 by determining, based on the refined proposed trajectory information and current location and/or pose of the autonomous vehicle, an amount of brake pressure to apply, a steering angle, a throttle amount to control the speed of the vehicle, and/or a transmission gear. The control module 970 can send the determined brake pressure, steering angle, throttle amount, and/or transmission gear to one or more devices in the autonomous vehicle to control and facilitate precise driving operations of the autonomous vehicle.

The deep image-based object detection 924 performed by the image-based object detection module 918 can also be used detect landmarks (e.g., stop signs, speed bumps, etc.) on the road (e.g., road 102 of FIG. 1). The in-vehicle control computer includes a fused localization module 926 that obtains landmarks detected from images, the landmarks obtained from a map database 936 stored on the in-vehicle control computer, the landmarks detected from the point cloud data item by the LiDAR based object detection module 912, the speed and displacement from the odometer sensor 944 and the estimated location of the autonomous vehicle from the GPS/IMU sensor 938 (i.e., GPS sensor 940 and IMU sensor 942) located on or in the autonomous vehicle. Based on this information, the fused localization module 926 can perform a localization operation 928 to determine a location of the autonomous vehicle, which can be sent to the planning module 962 and the control module 970.

The fused localization module 926 can estimate pose 930 of the autonomous vehicle based on the GPS and/or IMU sensors 938. The pose of the autonomous vehicle can be sent to the planning module 962 and the control module 970. The fused localization module 926 can also estimate status (e.g., location, possible angle of movement) of the trailer unit based on (e.g., trailer status estimation 934), for example, the information provided by the IMU sensor 942 (e.g., angular rate and/or linear velocity). The fused localization module 926 may also check the map content 932.

Figure 10:
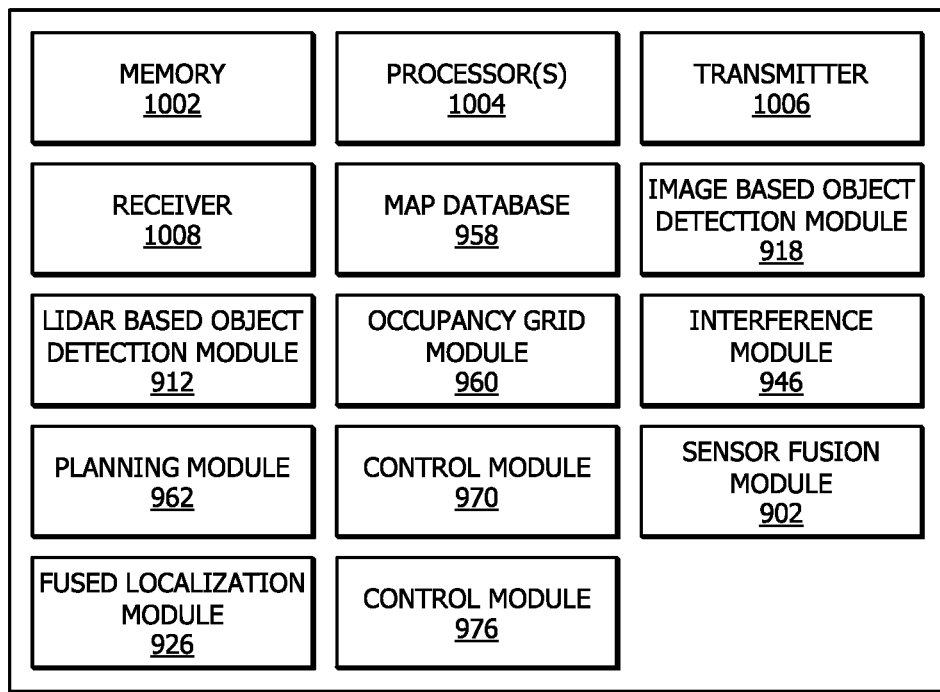
FIG. 10 illustrates a block diagram of an in-vehicle control computer included in the AV of FIG. 8.

FIG. 10 shows an exemplary block diagram of an in-vehicle control computer 850 included in an autonomous AV 802. The in-vehicle control computer 850 includes at least one processor 1004 and a memory 1002 having instructions stored thereupon (e.g., software instructions 138, 244, and processing instructions 880 in FIGS. 1, 2, and 8, respectively). The instructions, upon execution by the processor 1004, configure the in-vehicle control computer 850 and/or the various modules of the in-vehicle control computer 850 to perform the operations described in FIGS. 1-7. The transmitter 1006 transmits or sends information or data to one or more devices in the autonomous vehicle. For example, the transmitter 1006 can send an instruction to one or more motors of the steering wheel to steer the autonomous vehicle. The receiver 1008 receives information or data transmitted or sent by one or more devices. For example, the receiver 1008 receives a status of the current speed from the odometer sensor or the current transmission gear from the transmission. The transmitter 1006 and receiver 1008 are also configured to communicate with plurality of vehicle subsystems 840 and the in-vehicle control computer 850 described above in FIGS. 8 and 9.

While several embodiments have been provided in this disclosure, it should be understood that the disclosed systems and methods might be embodied in many other specific forms without departing from the spirit or scope of this disclosure. The present examples are to be considered as illustrative and not restrictive, and the intention is not to be limited to the details given herein. For example, the various elements or components may be combined or integrated into another system or certain features may be omitted, or not implemented.

In addition, techniques, systems, subsystems, and methods described and illustrated in the various embodiments as discrete or separate may be combined or integrated with other systems, modules, techniques, or methods without departing from the scope of this disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

Implementations of the disclosure can be described in view of the following clauses, the features of which can be combined in any reasonable manner.

Clause 1. A system, comprising:
an autonomous vehicle (AV) comprising at least one vehicle sensor, wherein the AV is configured to travel along a road;
a control device associated with the AV and comprising a processor configured to:
receive, from an operation server, a command to navigate the AV to avoid an unexpected road condition;
receive, from the at least one vehicle sensor, sensor data comprising location coordinates of a plurality of objects ahead of the AV;
determine whether at least one object from the plurality of objects impedes performing the command, such that the at least one object in on a pathway for navigating the AV according to the command;
in response to determining that the at least one object impedes performing the command, update the command, such that the updated command comprises one or more navigation instructions to avoid the at least one object while performing the command; and
navigate the AV according to the updated command.

Clause 2. The system of Clause 1, wherein the processor is further configured to:
compare the sensor data with map data, wherein the map data comprises location coordinates of expected objects on the road ahead of the AV;
based at least in part upon comparing the sensor data with the map data, determine whether the sensor data indicates an unexpected object that is not in the map data;
in response to determining that the sensor data indicates the unexpected object that is not in the map data:
determine a location coordinate of the unexpected object; and
determine a proposed navigation instruction for the AV to avoid the unexpected object.

Clause 3. The system of Clause 2, wherein the processor is further configured to, in response to determining that the sensor data indicates the unexpected object is not indicated in the map data, perform the proposed navigation instruction.

Clause 4. The system of Clause 2, wherein the processor is further configured to, in response to determining that the sensor data indicates the unexpected object is not in the map data:
communicate the proposed navigation instruction to the operation server;
determine whether a confirmation is received from the operation server to perform the proposed navigation instruction; and
in response to receiving the confirmation from the operation server, perform the proposed navigation instruction.

Clause 5. The system of Clause 2, wherein the processor is further configured to, in response to determining that the sensor data indicates the unexpected object is not in the map data:
communicate the sensor data to the operation server; and
request the operation server to provide instructions to avoid the unexpected object based at least in part upon the sensor data.

Clause 6. The system of Clause 1, wherein the operation server comprises a second processor configured to:
access environmental data associated with the road ahead of the AV, wherein:
the environmental data comprises at least one of weather data and traffic data;
the environmental data is associated with a time window during which the AV is traveling along the road;
compare the environmental data with the map data;
based at least in part upon comparing the environmental data with the map data, determine whether the environmental data comprises the unexpected road condition that is not included in the map data; and
in response to determining that the environmental data comprises the unexpected road condition that is not included in the map data, communicate the command to the AV to maneuver to avoid the unexpected road condition.

Clause 7. The system of Clause 6, wherein:
the processor is further configured to, in response to receiving the command from the operation server, communicate the sensor data to the operation server;
the second processor is further configured to:
receive the sensor data from the control device;
generate a second command that comprises one or more instructions for the one or more following AVs to avoid the unexpected road condition while avoiding the plurality of objects, wherein the second command comprises the location coordinate of the unexpected road condition indicated in the command and the location coordinates of the plurality of objects indicated in the sensor data, wherein:
the one or more following AVs are on the road behind the AV; and
the one or more following AVs are communicatively coupled with the operation server; and
communicate the second command to the one or more following AVs.

Clause 8. A method, comprising:
receiving, from an operation server, a command to navigate an autonomous vehicle (AV) to avoid an unexpected road condition, wherein:
the AV comprises at least one vehicle sensor; and
the AV is configured to travel along a road;
receiving, from the at least one vehicle sensor, sensor data comprising location coordinates of a plurality of objects ahead of the AV;
determining whether at least one object from the plurality of objects impedes performing the command;
in response to determining that at least one object from the plurality of objects impedes performing the command, updating the command, such that the updated command comprises one or more navigation instructions to avoid the at least one object while performing the command; and
navigating the AV according to the updated command.

Clause 9. The method of Clause 8, further comprising:
gathering, by one or more computing agent units, one or more health information reports from one or more components of the AV, wherein each of the one or more health information reports indicates a status of a performance of a corresponding component of the AV; and communicating, by the one or more computing agent units, the one or more heath information reports to the operation server.

Clause 10. The method of Clause 8, further comprising:

establishing, by one or more computing agent units, a first communication channel between the AV and the operation server;

receiving, from the operation server by the one or more computing agent units, a first periodic message at every periodic time interval to determine whether the first communication channel is lost, such that it is determined that the first communication channel is lost if the first periodic message is not received at least on one periodic interval; and in response to determining that the first communication channel is lost, establishing, by the one or more computing agent units, a second communication channel between the AV and a following AV on the road behind the AV.

Clause 11. The method of Clause 8, further comprising:

establishing, by one or more computing agent units, a third communication channel between the AV and a following AV on the road behind the AV;

receiving, from the following AV by the one or more computing agent units, a second periodic message at every periodic time interval to determine whether the third communication channel is lost, such that it is determined that the third communication channel is lost if the second periodic message is not received on least one periodic interval; and in response to determining that the third communication channel is lost, establishing, by the one or more computing agent units, a fourth communication channel between the AV and the operation server.

Clause 12. The method of Clause 8, wherein the unexpected road condition comprises at least one of an unexpected weather condition, an unexpected traffic congestion, an unexpected road closure, and an unexpected construction zone that is not included in the map data.

Clause 13. The method of Clause 8, wherein the command is related to at least one of:

a transition, by the AV, from autonomous driving to manual driving;

avoiding, by the AV, obstacles on the road ahead of the AV;

avoiding, by the AV, one or more certain lanes on which one or more obstacles are detected;

avoiding, by the AV, one or more certain routes on which the unexpected road condition is detected;

taking, by the AV, a particular re-route; and driving, by the lead AV, slower or faster than the speed indicated in a driving instruction associated with the lead AV.

Clause 14. The method of Clause 8, wherein:

the command comprises a broad command directed to the AV and one or more following AVs that are behind the AV on the road; and the broad command comprises one or more navigation instructions to avoid a particular unexpected road condition ahead of the AV.

Clause 15. The method of Clause 8, wherein:

the command comprises a specific command directed to the AV; and the specific command comprises one or more navigation instructions to avoid a particular unexpected road condition ahead of the AV.

Clause 16. A computer program comprising executable instructions stored in a non-transitory computer-readable medium that when executed by one or more processors causes the one or more processors to:

receive, from an operation server, a command to navigate an autonomous vehicle (AV) to avoid an unexpected road condition, wherein:

the AV comprises at least one vehicle sensor; and the AV is configured to travel along a road;

receive, from the at least one vehicle sensor, sensor data comprising location coordinates of a plurality of objects ahead of the AV;

determine whether at least one object from the plurality of objects impedes performing the command, such that the at least one object is on a pathway for navigating the AV according to the command;

in response to determining that the at least one object impedes performing the command, update the command, such that the updated command comprises one or more navigation instructions to avoid the at least one object while performing the command; and navigate the AV according to the updated command.

Clause 17. The computer program of Clause 16, wherein the instructions when executed by the one or more processors, further cause the one or more processors to, in response to determining that the environmental data comprises the unexpected road condition that is not included in the map data, propagate the command to one or more following AVs traveling along the road behind the AV.

Clause 18. The computer program of Clause 16, wherein:

the command comprises a configuration command; and the configuration command comprises at least one of changing a direction of the at least one vehicle sensor and changing a data sampling frequency of the at least one vehicle sensor.

Clause 19. The computer program of Clause 16, wherein the at least one vehicle sensor comprises at least one of a camera, a Light Detection and Ranging (LiDAR) sensor, a motion sensor, and an infrared sensor.

Clause 20. The computer program of Clause 16, wherein the AV is a tractor unit that is attached to a trailer.

What is claimed is:

1. A system, comprising:

an autonomous vehicle comprising at least one vehicle sensor, wherein the autonomous vehicle is configured to travel along a road;

a control device associated with the autonomous vehicle and comprising a processor configured to:

receive, from an operation server, a command to navigate the autonomous vehicle to avoid an unexpected road condition that is not sensed by the at least one vehicle sensor of the autonomous vehicle;

receive, from the at least one vehicle sensor, sensor data comprising location coordinates of a plurality of objects ahead of the autonomous vehicle;

determine whether at least one object from the plurality of objects impedes performing the command, such that the at least one object is on a pathway for navigating the autonomous vehicle according to the command;

in response to determining that the at least one object impedes performing the command, update the command, such that the updated command comprises one or more navigation instructions to avoid the at least one object while performing the command;
navigate the autonomous vehicle according to the updated command;
generate a second updated command for a following autonomous vehicle, wherein:
the second updated command is generated by further updating the updated command;
the second updated command comprises one or more navigation instructions to avoid the at least one object ahead of the autonomous vehicle and another object between the autonomous vehicle and the following vehicle while performing the command; and
the other object is determined to impede the following autonomous vehicle to perform the command; and
communicate the second updated command to the following autonomous vehicle.

2. The system of claim 1, wherein the processor is further configured to:
compare the sensor data with map data, wherein the map data comprises location coordinates of expected objects on the road ahead of the autonomous vehicle;
based at least in part upon comparing the sensor data with the map data, determine whether the sensor data indicates an unexpected object that is not in the map data;
in response to determining that the sensor data indicates the unexpected object that is not in the map data:
determine a location coordinate of the unexpected object; and
determine a proposed navigation instruction for the autonomous vehicle to avoid the unexpected object.

3. The system of claim 2, wherein the processor is further configured to, in response to determining that the sensor data indicates the unexpected object is not indicated in the map data, perform the proposed navigation instruction.

4. The system of claim 2, wherein the processor is further configured to, in response to determining that the sensor data indicates the unexpected object is not in the map data:
communicate the proposed navigation instruction to the operation server;
determine whether a confirmation is received from the operation server to perform the proposed navigation instruction; and
in response to receiving the confirmation from the operation server, perform the proposed navigation instruction.

5. The system of claim 2, wherein the processor is further configured to, in response to determining that the sensor data indicates the unexpected object is not in the map data:
communicate the sensor data to the operation server; and
request the operation server to provide instructions to avoid the unexpected object based at least in part upon the sensor data.

6. The system of claim 1, wherein the operation server comprises a second processor configured to:
access environmental data associated with the road ahead of the autonomous vehicle, wherein:
the environmental data comprises at least one of weather data and traffic data;
the environmental data is associated with a time window during which the autonomous vehicle is traveling along the road;
compare the environmental data with map data;
based at least in part upon comparing the environmental data with the map data, determine whether the environmental data comprises the unexpected road condition that is not included in the map data; and
in response to determining that the environmental data comprises the unexpected road condition that is not included in the map data, communicate the command to the autonomous vehicle to maneuver to avoid the unexpected road condition.

7. The system of claim 6, wherein:
the processor is further configured to, in response to receiving the command from the operation server, communicate the sensor data to the operation server;
the second processor is further configured to:
receive the sensor data from the control device;
generate a second command that comprises one or more instructions for the one or more following autonomous vehicles to avoid the unexpected road condition while avoiding the plurality of objects, wherein the second command comprises the location coordinate of the unexpected road condition indicated in the command and the location coordinates of the plurality of objects indicated in the sensor data, wherein:
the one or more following autonomous vehicles are on the road behind the autonomous vehicle; and
the one or more following autonomous vehicles are communicatively coupled with the operation server; and
communicate the second command to the one or more following autonomous vehicles.

* * * * *